US012805526B2

(12) United States Patent
Merle Farinos et al.

(10) Patent No.: US 12,805,526 B2
(45) Date of Patent: Nov. 24, 2026

(54) COMPOSITION FOR PREVENTING THE FORMATION OF SEEDS IN FRUIT

(71) Applicants: ASOCIACION CLUB DE VARIEDADES VEGETALES PROTEGIDAS, Valencia (ES); UNIVERSITAT POLITÈCNICA DE VALÈNCIA, Valencia (ES)

(72) Inventors: Hugo Basilio Merle Farinos, Valencia (ES); Alfonso Garmendia Salvador, Valencia (ES); Francisco Jose Garcia Breijo, Valencia (ES); Ma Dolores Raigon Jimenez, Valencia (ES)

(73) Assignees: ASOCIACION CLUB DE VARIEDADES VEGETALES PROTEGIDAS, Valencia (ES); UNIVERSITAT POLITÈCNICA DE VALÈNCIA, Valencia (ES)

( * ) Notice: Subject to any disclaimer, the term of this patent is extended or adjusted under 35 U.S.C. 154(b) by 866 days.

(21) Appl. No.: 17/629,220

(22) PCT Filed: Jul. 22, 2019

(86) PCT No.: PCT/ES2019/070509
§ 371 (c)(1),
(2) Date: Jan. 21, 2022

(87) PCT Pub. No.: WO2021/014028
PCT Pub. Date: Jan. 28, 2021

(65) Prior Publication Data
US 2022/0346381 A1 Nov. 3, 2022

(51) Int. Cl.
*A01N 59/02* (2006.01)
*A01N 43/12* (2006.01)

(52) U.S. Cl.
CPC ............. *A01N 59/02* (2013.01); *A01N 43/12* (2013.01)

(58) Field of Classification Search
CPC ........... A01N 59/02; A01N 43/12; A01H 3/04
See application file for complete search history.

(56) References Cited

FOREIGN PATENT DOCUMENTS

ES 2 323 028 A1 7/2009
ES 2 580 166 T3 8/2016

OTHER PUBLICATIONS

Bayoumi et al. (Applied Soil Ecology, 2019, 134, 15-24).*
USDA "sulfur" (https://www.ams.usda.gov/sites/default/files/media/SulfurLivestockTR.pdf, 2017, p. 1-12).*
Means (https://web.archive.org/web/20170624223815/https://meansnursery.com/spraying-fruit-trees/), 2017, no pagination.*
(Continued)

*Primary Examiner* — Carlos A Azpuru
(74) *Attorney, Agent, or Firm* — Sughrue Mion, PLLC

(57) ABSTRACT

The present invention relates to the agri-food industry and obtaining seedless fruit. The invention consists of an active product whose composition comprises sulphur (S) as an octatomic molecule ($S_8$) as its active ingredient, as well as optionally a surfactant and a plant hormone, preferably gibberellic acid or auxins and its use in a method for obtaining seedless fruit that comprises the application of the active product on crops, flowers, horticultural plants and/or fruit trees.

7 Claims, 36 Drawing Sheets

(56) References Cited

OTHER PUBLICATIONS

Vtech (https://vtechworks.lib.vt.edu/server/api/core/bitstreams/23a134a8-990a-4dad-b733-95e60471de3f/content), 2017, p. 1-179.*
USDA (https://web.archive.org/web/20170524162938/https://www.ams.usda.gov/sites/default/files/media/SulfurLivestockTR.pdf), 2017, p. 1-12.*
Drexel (https://www3.epa.gov/pesticides/chem_search/ppls/019713-00238-20090217.pdf), 2009, p. 1-10.*
Cheng et al. PLoS One, 2013, 8(11), e80044.*
Moncharmwinetraders (https://moncharmwinetraders.co.uk/lifecycle-of-a-grapevine/#:~:text=How%20long%20do%20the%20blossoms,start%20to%20produce%20grape%20berries.), no pagination, 2022.*
Emmett et al, Sulfur formulations, particle size and activity, a review, Strategic use of Sulfur in Integrated Pest and Disease Management (IPM) Programs for Grapevines, pp. 52-57. (Year: 2003).*
Cheng et al, PloS one, , 8(11), e80044 (Year: 2013).*
Bob Emmett, "Sulphur formulations, particle size and activity—a review" Strategic Use of Sulphur in Integrated Pest and Disease Management (IPM) Programs for Grapevines, Dec. 1, 2003, pp. 52-57.
J.S. Williams, et al., "The oldest fungicide and newest phytoalexin—a reappraisal of the fungitoxicity of elemental Sulphur", Plant Pathology, 2004, pp. 263-279, vol. 53, No. 3.
Nibedita Bose, et al., "Evaluation of nitrosulf and elemental Sulphur on growth and yield of rapeseed (*Brassica campestris* L.) in India", Archives of Agronomy and Soil Science, Feb. 2009, pp. 79-90, vol. 55, No. 1.
Carlos Mesejo, et al., "The inhibitory effect of $CuSO_4$ on Citrus pollen germination and pollen tube growth and its application for the production of seedless fruit", Plant Science, 2006, pp. 37-43, vol. 170, No. 1.
Tiziana Pandolfini, "Seedless Fruit Production by Hormonal Regulation of Fruit Set", Nutrients, Dec. 23, 2009, pp. 1-9 vol. 1, No. 2.
International Search Report for PCT/ES2019/070509 dated Mar. 4, 2020 [PCT/ISA/210].
Written Opinion for PCT/ES2019/070509 dated Mar. 4, 2020 [PCT/ISA/237].
International Preliminary Report on Patentability for PCT/ES2019/070509 dated Jun. 30, 2021.

* cited by examiner

Results in fruit
Number of seed x treatment

Treatment (D) = day on which pollination takes place after applying AP

[A7]

Results in fruit
Number of seed x treatment

Treatment (D) = day after pollination on which AP is applied

[A8]

[A10]

COMPOSITION FOR PREVENTING THE FORMATION OF SEEDS IN FRUIT

CROSS REFERENCE TO RELATED APPLICATION

This application is a National Stage of International Application No. PCT/ES2019/070509 filed Jul. 22, 2019.

TECHNICAL FIELD OF THE INVENTION

The present invention relates to the agri-food industry and refers specifically to a new composition which, when applied to the blossom of horticultural plant and/or fruit tree crops, prevents the formation of seeds in the fruit in an effective manner without reducing the yield and/or quality of the fruit.

The novel composition, subject of the present invention, contains sulphur(S) as its active agent and prevents the formation of seeds in fruit once applied in accordance with the method of the present invention.

BACKGROUND OF THE INVENTION

Fresh produce markets are ever more demanding in terms of internal and external quality of fruit and vegetables[1-3]. One of the quality characteristics most valued by consumers is the absence of seeds[4].

Thus, for over two decades, researchers and farmers alike have sought techniques that prevent the formation of seeds in varieties and cultivated varieties. Covering crops with anti-bee netting or cultivating in greenhouses are some of the most effective techniques to date[5], as they prevent the presence of pollinators and thus the pollination and fertilisation of ovules. The greatest disadvantages these techniques have are their high cost in terms of labour and materials, and occasionally a reduction in yield which, in mandarins for example, is estimated to be around 30%[1,2,5,6].

Other techniques used such as applying bee repellents based on zinc complexes or on *Capiscum annuum* extracts, as well as chemical applications with copper and gibberellic acid have achieved very low effectiveness of between 10 and 35%[1,2,7,8]. In those studies, the limited reduction of seeds has been attributed to the copper and its inhibitive effect on the male part, in other words, on the germination of the pollen tube[7,8]. These reductions are not sufficient for the objective of improving quality and thus do not imply a price increase for treated fruit. Currently, these chemical techniques are not used in the field due to their low effectiveness, which does not offset the cost of treatment.

Finally, new seedless varieties can be obtained through plant breeding, triploid hybrids, gamma ray induced mutations or new biotechnological techniques[9-13].

Thus, for example, seedless watermelon is obtained through hybridisation, crossing two plants with incompatible sets of chromosomes. The key lies in placing one plant close to the other so they cross-pollinate, but do not fertilise, so that the resulting fruit is a seedless watermelon. In this example, the male pollen of a diploid watermelon is crossed with the flower of a tetraploid watermelon to obtain a sterile hybrid (triploid watermelon), which is unable to produce seeds.

Fruit such as seedless oranges and grapes are examples of mutations that, through the process of selection and cross-breeding, have produced new varieties.

On other occasions, mutation is used to produce seedless fruit through gamma irradiation, or more recently through a gene editing technique (CRISPR) in order to deliberately introduce a mutation with the aim of producing seedless fruit. This technique is being tested on tomatoes. In this case, mutation increases auxin hormone levels, which stimulate the fruit to develop, even though seeds have not yet begun to form.

Spanish patent ES2323028 describes a method that uses mutation to obtain seedless tomatoes. The method is based on the transfer and expression of the LFY gene in *Arabidopsis thaliana* to transgenic tomato plants. The fruit of transgenic plants with the LFY gene maintains the same size and weight of that of the original crop, but contains no seeds, is fleshier, has less pulp and is slightly pointed in shape.

Spanish patent ES2580166 describes a pepper plant that generates seedless fruit, where said plant is produced stably over several generations through retro breeding, and where the plant is obtained through a cross-breeding method that consists of the stages of a) Selecting the first filial generation plant capable of producing seedless fruit that has a male sterility feature and a parthenocarpic feature of the first filial generation group of plants, created through cross-breeding the plant of a male sterile line with the plant of a parthenocarpic line; b) Crossing the plant of the first filial generation thus selected with a plant of a fixed parthenocarpic line that is able to retain the parthenocarpic feature and the male sterility feature of the plant, as parental pollinator, in order to use it to create a progeny plant that has the parthenocarpic feature and the male sterility feature; c) Retro breeding the progeny plant thus created once again with the plant of the fixed parthenocarpic line used as the parental pollinator in stage b), as parental pollinator, to thus create a plant from the progeny that has the parthenocarpic feature and the male sterility feature.

But obtaining seedless fruits does not guarantee that those fruits will be well-received on the market. The absence or presence of seeds is just one of the quality characteristics in the collection of characteristics that fruit must satisfy. Therefore, even after many years of work it is possible that the new parthenocarpic varieties are not adequately introduced on the market[14,15]. Consequently, a different approach to the problem is, once having obtained a successful variety, to seek an effective treatment that prevents the formation of its seeds, thus increasing its value.

The present invention provides a composition which, when applied to horticultural crops and fruit crops, that is, horticultural plants and fruit trees, during the "flowering" stage, prevents the formation of seeds in fruit without being toxic for the plant and the pollinators, as well as without negatively affecting the quality and quantity of the yield.

BRIEF DESCRIPTION OF THE INVENTION

The subject of the present invention is a new composition which, when applied to the blossom of crops, is able to prevent the formation of seeds in the fruit of the treated plants.

Application must be carried out during the flowering stage (anthesis) and the composition consists of sulphur(S) as an active ingredient, whose activity provokes the collapse of the stigma papilla cells of the flower, and optionally a plant hormone whose activity helps stabilise the crop. In addition, the composition consists of a surfactant that facilitates the application of the composition to the crops through spraying methods.

The authors of the present invention have discovered that sulphur(S), once applied to the flower of the horticultural plant and/or fruit tree, provokes the collapse of the stigma papilla cells, thus preventing pollen tube growth and therefore preventing the formation of seeds in the fruit.

The authors of the present invention have also observed a reduction effect on the intensity of fruit formation deriving from the foregoing effect. Depending on the concentration at which the active product is applied, this can reduce the total number of fruit in the crop, which can be beneficial for obtaining less fruit, but of a greater size, thus increasing the commercial value of the yield. For crops with low or no parthenocarpic capacity (such as for example fruit trees of the rosaceae family), by preventing fertilisation the partial formation of fruit is also prevented. This secondary effect deriving from the main effect (collapse of the stigma papilla cells) can be useful for regulating the quantity of fruit per tree in these kinds of crops.

For the purposes of the present invention, the terms "impede, prevent and reduce" the formation and number of seeds in fruit covers between 95 and 100% growth inhibition of the pollen tubes inside the stigma and thus the formation of seeds in flowers that have been homogeneously treated with the suitable concentration of the product in a timely manner.

For the purposes of the present invention, the term "flowering" corresponds to the anthesis stage and covers the moment from when the flower opens and the stigma is exposed and receptive to pollen grains.

For the purposes of the present invention the term "state of pre-pollination" covers the state prior to the arrival of the pollen grains in the stigma of the flower.

For the purposes of the present invention the term "state of post-pollination" covers the state after the arrival of the pollen grains in the stigma of the flower.

Therefore, the subject of the present invention is a composition to prevent the formation of seeds in the fruit of horticultural plants and/or fruit trees that consists of sulphur (S) and that provokes the collapse of stigma papilla cells.

The subject of this invention is also a composition as described above, characterised by the sulphur (S) being present in the composition at between 50-100% (m/m) in weight compared to the total weight of the composition.

The subject of this invention is also a composition in accordance with the foregoing paragraphs, characterised by consisting additionally of a surfactant for generating a stable aqueous solution that facilitates its application and improves its effectiveness.

The subject of this invention is also a composition as described above characterised by the surfactant being selected from the group that consists of: non-ionic and anionic surfactants, as well as mixtures thereof.

The subject of this invention is also a composition as described above characterised by the sulphur (S) and the surfactant being present in the composition at a ratio of 100:1 to 1:10 (sulphur:surfactant).

The subject of this invention is also a composition as described above that also consists of a plant hormone.

The subject of this invention is also a composition as described above characterised by the plant hormone being present in the composition at a concentration of between 0 $mg \cdot L^{-1}$-500 $mg \cdot L^{-1}$.

The subject of this invention is also a composition as described above characterised by the plant hormone being selected from the group consisting of: gibberellic acid, auxin and cytokinin, as well as mixtures thereof.

The subject of this invention is also a composition as described above characterised by the plant hormone being gibberellic acid.

The subject of this invention is also a composition as described in the foregoing paragraphs characterised by the sulphur(S) present in the composition being in the form of an octatomic molecule ($S_8$).

The subject of the present invention is also a composition to prevent or reduce the formation of seeds in the fruit of horticultural plants and/or fruit trees that consists of sulphur (S) as an octatomic molecule ($S_8$), polysorbate 20 and gibberellic acid.

The subject of this invention is a composition characterised by consisting of:

0.1 $g \cdot L^{-1}$-100 $g \cdot L^{-1}$ surfactant:polysorbate 20

0.1 $g \cdot L^{-1}$-100 $g \cdot L^{-1}$ sulphur. (S) as an octatomic molecule ($S_8$); and 1 mg/L-300 mg/L plant hormone:gibberellic acid.

In addition, the subject of this invention is also the use of a composition as defined in any of the foregoing paragraphs to prevent, or reduce, the formation of seeds in the fruit of horticultural plants and/or fruit trees.

The subject of this invention is also the use of a composition as detailed in the foregoing paragraphs to regulate the intensity of formation (number of fruit formed per plant) of horticultural plants and/or fruit trees.

In addition, the subject of this invention is a method to prevent the formation of seeds in the fruit of horticultural plants and/or fruit trees that consists in the stage of applying an effective amount of the composition as described in any of the foregoing paragraphs, where such application is performed on the flower of the horticultural plant and/or fruit tree during the "flowering" stage.

The subject of this invention is also a method to prevent the formation of seeds in the fruit of horticultural plants and/or fruit trees as described above, that consists in the application of a composition of the present invention, as described above, where such application is performed on the flower of the horticultural plant and/or fruit tree during the "flowering" stage in a state of pre-pollination.

The subject of this invention is also a method to reduce the formation of seeds in the fruit of horticultural plants and/or fruit trees as described above, that consists in the application of a composition of the present invention, as described in the foregoing paragraphs, during the "flowering" stage in a state of post-pollination.

The subject of this invention is also a method for reducing the formation of seeds in the fruit of horticultural plants and/or fruit trees in accordance with the foregoing paragraphs, where application is performed using spraying, soaking or similar methods The subject of this invention is also a method for reducing the formation of seeds in the fruit of horticultural plants and/or fruit trees in accordance with the foregoing paragraphs, where treatment is administered in various applications during the crop flowering period.

In addition, the subject of this invention is also a seedless fruit characterised by the lack of seeds in its interior despite having been pollinated.

The subject of this invention is also a seedless fruit characterised by the lack of seeds in its interior despite having been pollinated, obtained through the method defined in the foregoing paragraphs.

In addition, the subject of this invention is a horticultural plant and/or fruit tree treated with the composition of the present invention as defined in the foregoing paragraphs characterised by the horticultural plant and/or fruit tree being covered with the composition.

The subject of this invention is also a horticultural plant and/or fruit tree characterised by the presence of seedless fruit.

The subject of this invention is also a horticultural plant and/or fruit tree as defined above, characterised by the presence of collapsed stigma papilla cells.

And finally, the subject of this invention is also a horticultural plant and/or fruit tree as defined in the foregoing paragraphs characterised by the lack of pollen tubes growing in the stigma once pollination of the horticultural plant and/or fruit tree has been produced.

BRIEF DESCRIPTION OF THE DRAWINGS

FIG. 9A: Untreated stigma (C+) presence of PT FIG. 9B: Stigma treated with AP without PT FIG. 10A: Fruit of untreated pollinated flowers (seeds) FIG. 10B: Fruit of treated pollinated flowers (seedless)

FIG. 11A: Untreated stigma (C+) presence of PT FIG. 11B: Stigma treated with AP without PT.

FIG. 12A: Untreated stigma (C+) presence of PT FIG. 12B: Stigma treated with AP without PT.

FIG. 13A: Untreated stigma (C+) presence of PT FIG. 13B: Stigma treated with AP without PT.

FIG. 14A: Untreated stigma (C+) presence of PT FIG. 14B: Stigma treated with AP without PT.

FIG. 15A: Untreated stigma (C+) presence of PT FIG. 15B: Stigma treated with AP without PT.

FIG. 16A: Untreated stigma (C+) presence of PT FIG. 16B: Stigma treated with AP without PT.

FIG. 17A: Untreated stigma (C+) presence of PT FIG. 17B: Stigma treated with AP without PT.

FIG. 12A shows mortality rates after 48 hours. FIG. 12B depicts the logistic model with the logarithm of the concentrations. Log (LD50)=11.84, therefore, LD50=139, 017 μg/bumblebee.

DETAILED DESCRIPTION OF THE INVENTION

The present invention is for application in the agri-food industry, specifically for obtaining seedless fruit from horticultural plants and/or fruit trees of the angiosperm group.

Angiosperm plant crops have the capacity to produce flowers and fruit with one or more seeds in their interior. When fertilisation takes place, the ovary matures and transforms into fruit. Its reproductive organs are the androecium, male organ of the flower, and the gynoecium or pistil which is the female organ of the flower in whose ovary the female gametophyte is found. The seeds of angiosperm plants are located inside the fruit.

During sexual reproduction of angiosperm, and specifically during the pollination stage, pollen is transferred from the anther of one flower to the stigma of another or to the same flower, either by the wind or through insect pollinators. Once the pollen grain reaches the stigma, this grows in the form of a tube, which allows the male gametophyte to descend through the style and to reach the seminal primordium where the female gametophyte is located, in order to fertilise it. From that moment the seminal primordia transform into seeds and the rest of the gynoecium, mainly the ovary, into fruit.

In their maturity, stigmas can be of two types, wet or dry, depending on whether or not they secrete a characteristic exudate. Their surface is generally papillous. The term "papilla" applies to those individual or grouped receptive stigmatic cells that are held significantly free from each other above the general surface of the stigma. Once inside the stigma, the pollen germinates, emitting a pollen tube (PT) through which the 2 germinative or spermatic nuclei pass which then fertilise the female gametophyte. The pollen tube must penetrate through the stigma tissue and the style in order to reach the egg.

Figure 1:
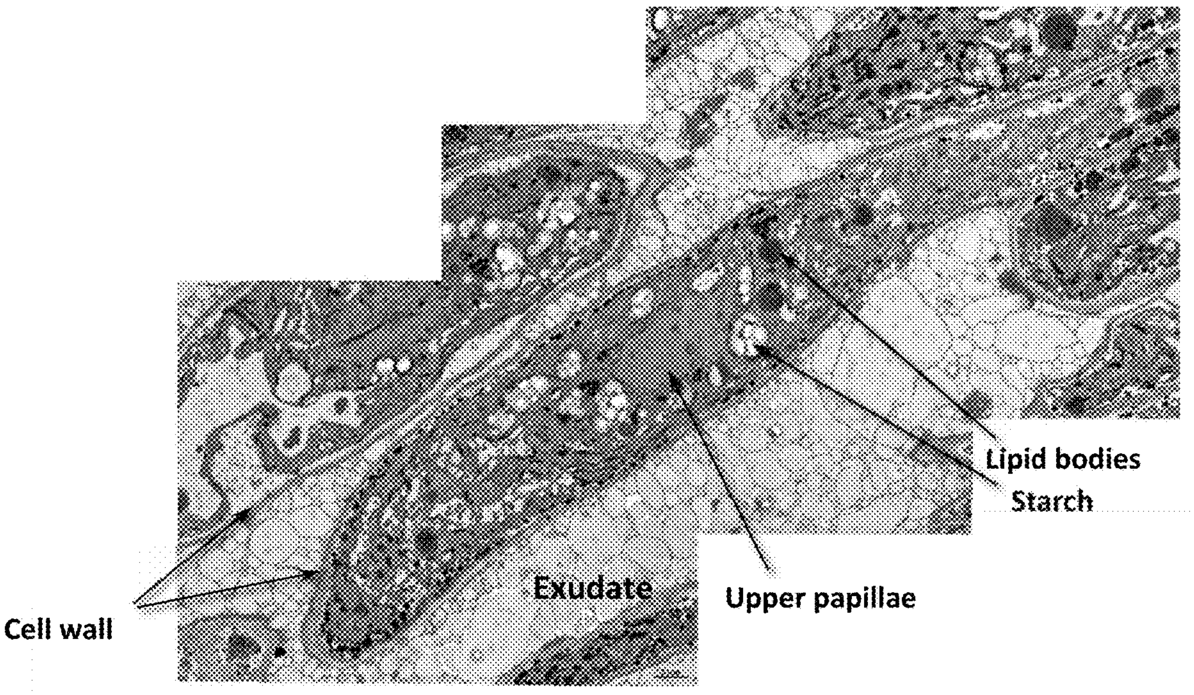
FIG. 1 depicts a view through TEM (Transmission Electron Microscopy) of different parts of the healthy upper stigmatic papillae of an "untreated" papilla cell, showing that the cell is healthy, complete and with its characteristic shape.
Figure 2:
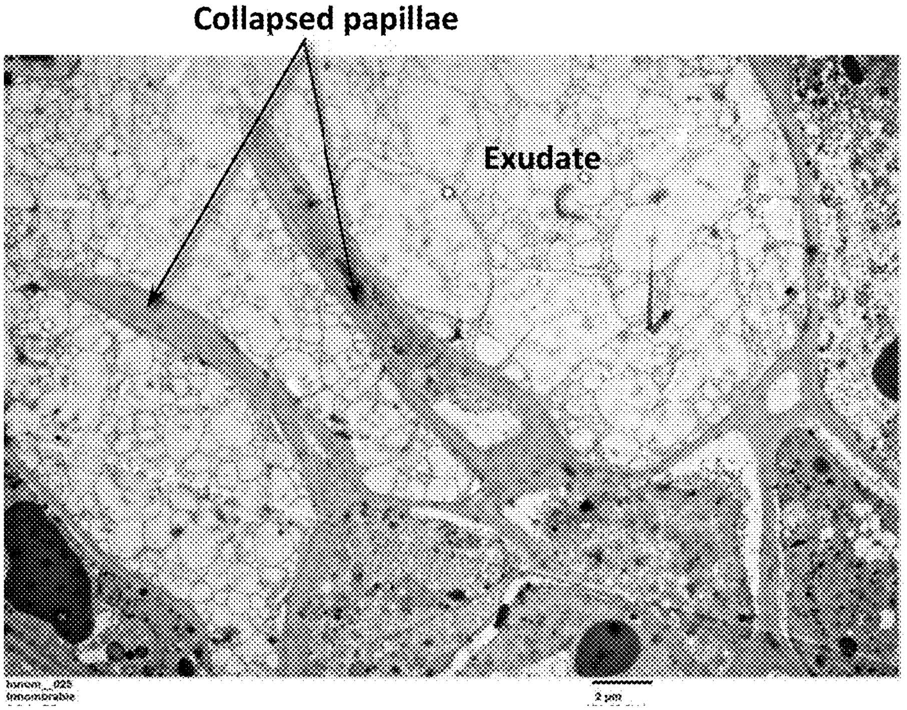
FIG. 2 depicts a view through TEM of different parts of the damaged upper papillae of a papilla cell treated with the active product of the present invention, showing how the papilla cell has lost turgidity and part of its components and appears collapsed.
Figure 3:
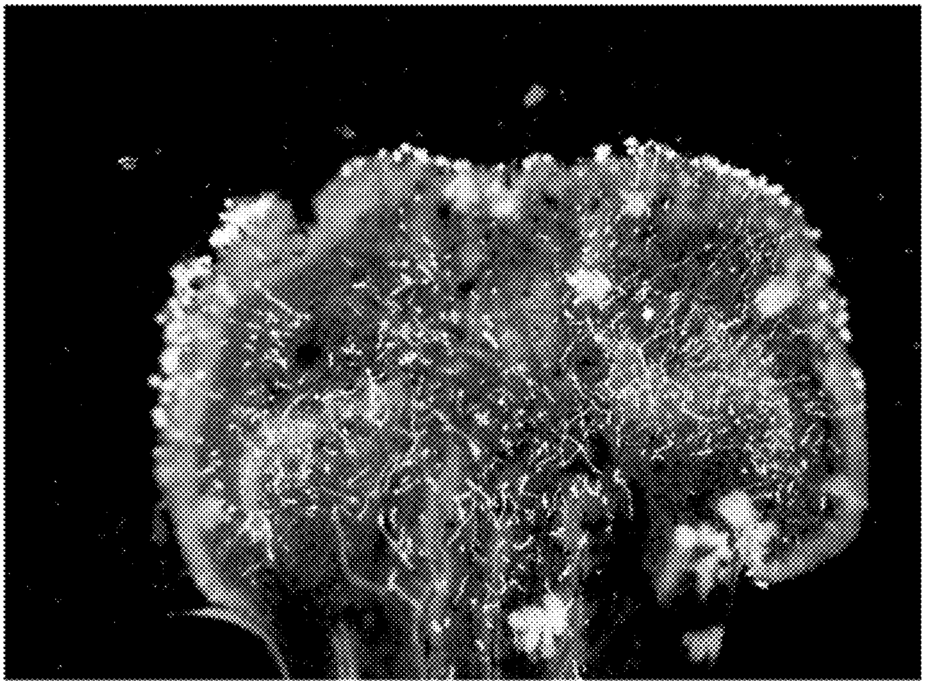
FIG. 3 depicts a view through a fluorescence microscope of the stigma of an untreated pollinated mandarin flower, showing the pollen tubes (presence of "fluorescent fibres") growing inside the stigma and style.
Figure 4:
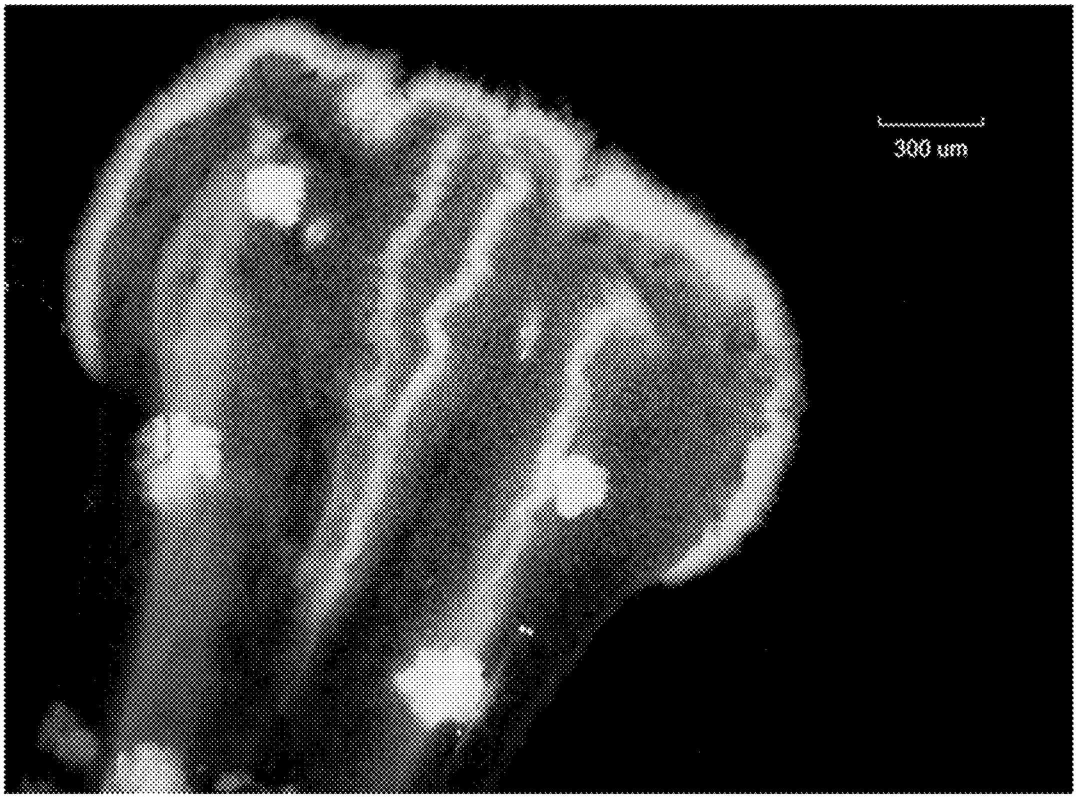
FIG. 4 depicts a view through a fluorescence microscope of the stigma of a pollinated mandarin flower treated only with the active ingredient ($S_8$) of the present invention, showing that there are no pollen tubes in the stigmatic area (absence of "fluorescent fibres").

The authors of the present invention have discovered an active product for applying to flower crops capable of provoking the collapse of the stigma papilla cells, thus preventing pollen tube growth and therefore preventing the formation of seeds in fruit, but without altering the formation of the fruit itself. Specifically, it has been verified that the active product affects the stigmatic area of the flowers. In this area, the product has two effects: (i) it provokes the collapse of the stigma papilla cells that receive the pollen and (ii) it reduces the amount of exudate (secretion) (FIGS. 1 and 2). As a result of this collapse, papilla cells lose their functionality and even though the pollen reaches the flower, it is unable to grow inside it (FIGS. 3 and 4). As the pollen is unable to enter the flower, it is not fertilised and so no seeds are formed.

This way, the active product of the present invention finds its use in the agro-food industry, specifically for obtaining seedless fruit.

In a preferred embodiment of the present invention, the active product is for applying to angiosperm crops that produce fruit with seeds and that have a certain parthenocarpic capacity with or without the aid of plant hormones. Among other crops, the product is applicable to species belonging to the following families: rutaceae (mandarin, tangelo, lemon, grapefruit, lime, kumquat, sweet orange and others), vitaceae (table grape and others), curcubitaceae (watermelon, melon, cucumber, pumpkin, courgette, and others) and solanaceae (aubergine, pepper, tomato and others) among other families of cultivated plants. The active product has been tested on very diverse families and species (see example 1) always noting the same effect: a collapse of the papilla cells of the stigma that prevents the growth of pollen tubes, and so its action is broad and can be of use for preventing the formation of seeds in a great variety of crops.

In accordance with the present invention, the product is particularly effective when used on the following species and/or varieties of *citrus*: clemenules, *fina* clementine, murcott, nadorcott, nova, and other tangelos and mandarins, lemons, Mexican lime, grapefruit, sweet oranges and kumquats, as well as on the following horticultural species and/or varieties: cucumber, aubergine, melon, courgette, and watermelon, among others.

The active product in accordance with the present invention consists of a composition comprising sulphur (S) as the active ingredient of the composition. Sulphur (S) is present in the composition at a rate of 50-100% (m/m) in weight compared to the total weight of the composition. Preferably, the composition consists of the chemical element sulphur (S) in its basic form, in other words, as an octatomic molecule ($S_8$) and in such case the amount in the composition varies between 50-100% (m/m) in weight compared to the total weigh of the composition. Said active ingredient can be obtained from its native element form in natural deposits (mines or underground deposits). There are, however, commercial products that can be used for the purposes of the invention, for example Quimetal®, Lucava®, Diranzo®, Repsol® agricultural sulphur, etc.

The concentration at which the sulphur(S) must be present in the composition will depend on the crop and the desired effect. In general, sulphur(S) and specifically sulphur(S) as an octatomic molecule (Ss) is present at a rate of 0.01-10% (m/v). That is, the concentration of sulphur in the product can vary between 0.1 $g\cdot L^{-1}$-100 $g\cdot L^{-1}$.

In a specific embodiment of the present invention, the contents of sulphur(S) in general and sulphur(S) as an octatomic molecule (Ss) present in the composition is between 0.5-4% (m/v), if the product is destined for application on *citrus* fruit trees, such as the mandarin. If the product is destined for application on horticultural species; the content of sulphur(S) in general and sulphur(S) as an octatomic molecule (Ss) in particular, present in the composition is between 0.1-1.5% (m/v).

In a specific embodiment of the present invention, in addition to the sulphur(S) the active product also comprises, as described in the foregoing paragraphs, a surfactant in order to achieve a stable and homogeneous aqueous solution of the active ingredient, sulphur(S) as an octatomic molecule (Ss). Surfactants that can form part of the formulation of the active product can be selected from the following groups: (i) non-ionic surfactants such as: polysorbate 20 or polyoxyethylene sorbitan monolaurate (20) (trade name Tween®20), octyl phenol ethoxylate (trade name Triton® X-100), n-dodecyl-β-D-maltoside (DDM), digitonine, polyoxyethylene sorbitan monooleate (20) (trade name Tween®80), sorbitan esters, alkyl polyglucosides (APG), nonylphenoxylated (nonoxyols), propoxylated fatty alcohols (FAPO) and polyalkylene glycol (ethoxylated fatty alcohols (FAEO)); (ii) anionic surfactants, such as: soda or potash soap, carboxylic esters, alkyl carboxylates, carboxylic acid derivatives, and acrylic surfactants; as well as mixtures thereof. Preferably, the composition of the present invention consists of the non-ionic surfactant:polysorbate 20.

In a specific embodiment of the present invention, the surfactant and the active ingredient sulphur (S) appear in the composition at a rate of from 100:1 to 1:10 (active ingredient:surfactant) depending on the characteristics of the stigma to be treated. For wet stigmas the amount of the surfactant can be reduced (10:1), whereas for dry stigmas a greater proportion may be necessary (1:5). The preferable ratio between surfactant and sulphur (S) in the composition is 1:1.

In another specific embodiment of the present invention, the active product of the present invention consists of: polysorbate 20 and the active ingredient sulphur (S) as an octatomic molecule ($S_8$). In this case, the surfactant and the active ingredient sulphur (S) as an octatomic molecule ($S_8$) appear in the composition at a rate of from 100:1 to 1:10 (active ingredient:surfactant) depending on the characteristics of the stigma to be treated. The preferable ratio between surfactant and sulphur (S) as an octatomic molecule ($S_8$) in the composition is 1:1.

In another specific embodiment of the present invention, the active product in addition to the sulphur(S) and surfactant components, also comprises a plant hormone or plant growth regulator. Plant hormones that can form part of the formulation of the active product of the present invention can be selected from the group comprising: gibberellic acid (GA), auxins and cytokines, as well as mixtures thereof. Preferably, the composition of the present invention consists of the plant hormone: gibberellic acid.

Gibberellic acid (or gibberellin $A_3$, GA, $GA_3$, $GA_x$) is a plant hormone found in plants. Its chemical formula is $C_{19}H_{22}O_6$. When purified it is a white to pale-yellow powder, soluble in ethanol and somewhat soluble in water.

GA has been broadly studied as a plant hormone related to cell growth and division, it is a hormone that stimulates growth[16-19].

In the flowering stage and initial formation of fruit, GA plays an essential role inside the ovaries[20,21]. The formation of seed generates GA, and this acts as a hormone signal that accentuates the sump-like nature of the ovary; this signal makes the plant send more: carbohydrates to that ovary in particular, which causes it to grow, form and end in a fruit[22,23].

In order to prevent the formation of seeds through the action of the active ingredient of the present invention, the stimulus (in the form of GA), important for the formation of the fruit, can be eliminated, which could mean a reduction in the yield. Some seedless varieties and cultivated varieties or those that are cultivated under anti-bee netting experience yield problems[1,2,5,6]. Highly productive and parthenocarpic (seedless) varieties tend to have high natural and endogenous levels of GA[20,21].

Therefore, the formula could benefit from a certain amount of GA or another growth hormone such as auxins, which counteract the possible loss of stimulation caused by the lack of formation of the seeds. The quantity of hormone needed depends on the crop, the variety and other factors and will be combined with the active product.

Fermentation of nitrogenated, carbonated sources and mineral salts is the most natural way of obtaining commercial gibberellin. As a carbonated source, glucose, sucrose and natural flours are used and phosphate and magnesium mineral salts are applied.

The process requires 5 to 7 days for effective fermentation. It requires constant agitation and aeration, maintaining an average temperature of 28° C. to 32° C., and PH levels of 3-3.5.

The process for recovering the gibberellin is done through disassociating the biomass from the fermented stock. In this case the cell-free supernatant contains the elements used as plant growth regulators.

In the laboratory, gibberellin particles can be recovered through a liquid-liquid column extraction process. For this technique, ethyl acetate is used as an organic solvent. Alternatively, anionic exchange resins are applied to the supernatant, thus achieving gibberellin precipitation through gradient elution. Finally, the particles are dried and crystallised in accordance with the established degree of purity.

Commercial products that can be used for the purposes of the present invention are: Semefil®, Berelex®, Novagib®, etc.

The concentration of GA present in the composition/active product of the present invention will depend on the crop and other factors such as flowering intensity. In a specific embodiment of the present invention, the concentration of GA in the composition/active product is between 0 $mg \cdot L^{-1}$-500 $mg \cdot L^{-1}$, and preferably between 1 $mg \cdot L^{-1}$-300 $mg \cdot L^{-1}$.

In a specific embodiment of the present invention, the active product of the present invention consists of: non-ionic surfactant, the active ingredient sulphur (S) as an octatomic molecule ($S_8$) and gibberellic acid. Preferably, the active product, in other words, the composition of the present invention, consists of: polysorbate 20, the active ingredient sulphur (S) as an octatomic molecule ($S_8$) and gibberellic acid. A preferred embodiment of the present invention consists of:

0.1 $g \cdot L^{-1}$-100 $g \cdot L^{-1}$ surfactant: polysorbate 20

0.1 $g \cdot L^{-1}$-100 $g \cdot L^{-1}$ sulphur (S) as an octatomic molecule ($S_8$); and 1 mg/L–1-300 $mg \cdot L^{-1}$ plant hormone: gibberellic acid.

The process for preparing the composition/active product of the present invention is carried out in accordance with the commonly known practice of an expert in the field and consists of the stages of: mixing and shaking the surfactant with the sulphur(S), without adding water, until the surfactant sufficiently covers the sulphur(S) molecules, subsequently adding water until the desired concentration of the solution is obtained and finally adding the plant hormone to the concentrated solution of the active product.

The methods for applying the active product of the present invention to the flowers of crops are the normal methods for the application of chemical synthesis products on crops. In particular, it is foreseen that the active product/composition be applied to crops through conventional atomisation machinery for agricultural treatment. Specifically, application through spraying, soaking and similar systems is foreseen.

To that end, prior to application, the concentrated active product obtained in accordance with the foregoing paragraphs will be diluted in water until the recommended concentration is obtained depending on the crop.

For example, for conventional spraying machinery with a 100 L tank and for a concentration of 2% of active product 1:1 surfactant and 40 mg. $L^{-1}$ GA, a concentrated solution with 2 L of polysorbate 20+2 kg of sulphur+0.25 L of GA solution (16 $g \cdot L^{-1}$ of concentrated gibberellic acid)+1.75 L. water is prepared until a homogeneous solution of all components is obtained. This concentrated solution is placed in the tank and levelled up to 100 L (to that end an additional 96 L of water is needed). Mix the mixture with the tank's pressure turbo prior to application in order to homogenise the mixture.

On the other hand, the best time for applying the active product will be preferably: first thing in the morning to avoid the highest hours of sunshine and temperatures, as with other phyto-regulator applications. Furthermore, the flower is also reached at its most receptive time. The dose of the active product needed to obtain effective results is determined on the basis of the volume of the crown or foliage and the intensity of flowering.

Figure 5:
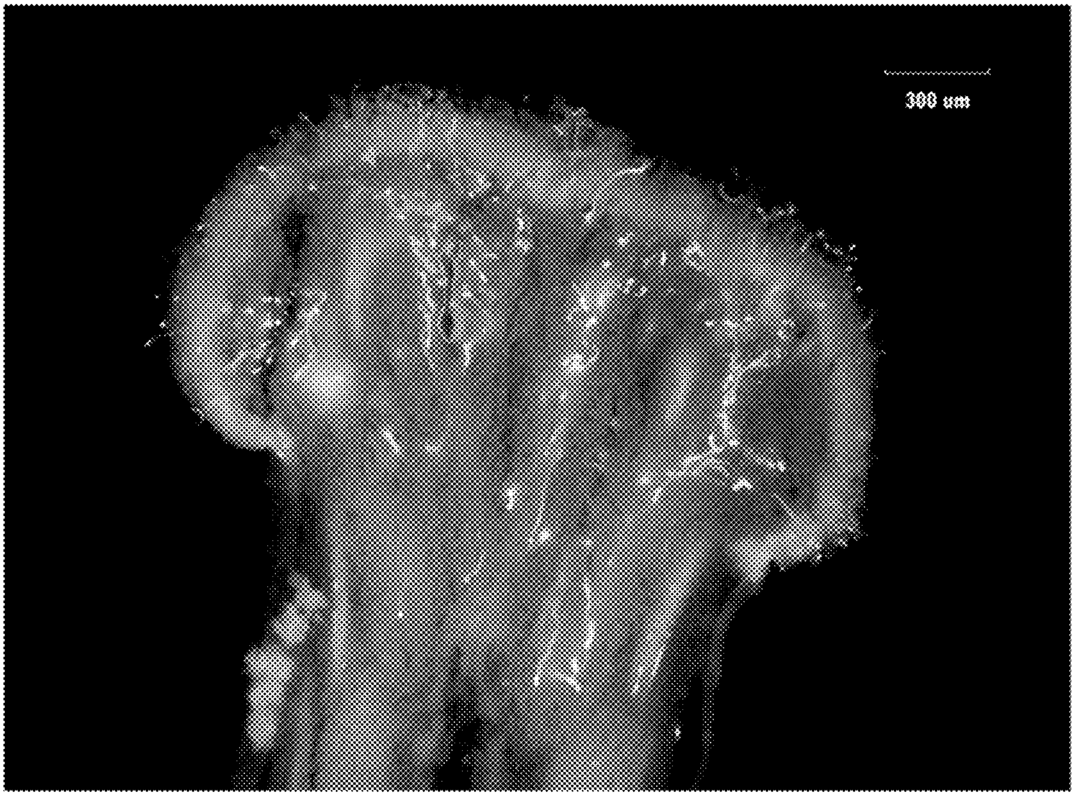
FIG. 5 depicts a view through a fluorescence microscope of the stigma of a pollinated mandarin flower treated only with gibberellic acid without active ingredient ($S_8$). The presence of pollen tubes inside the stigma can be clearly seen.
Figure 6:
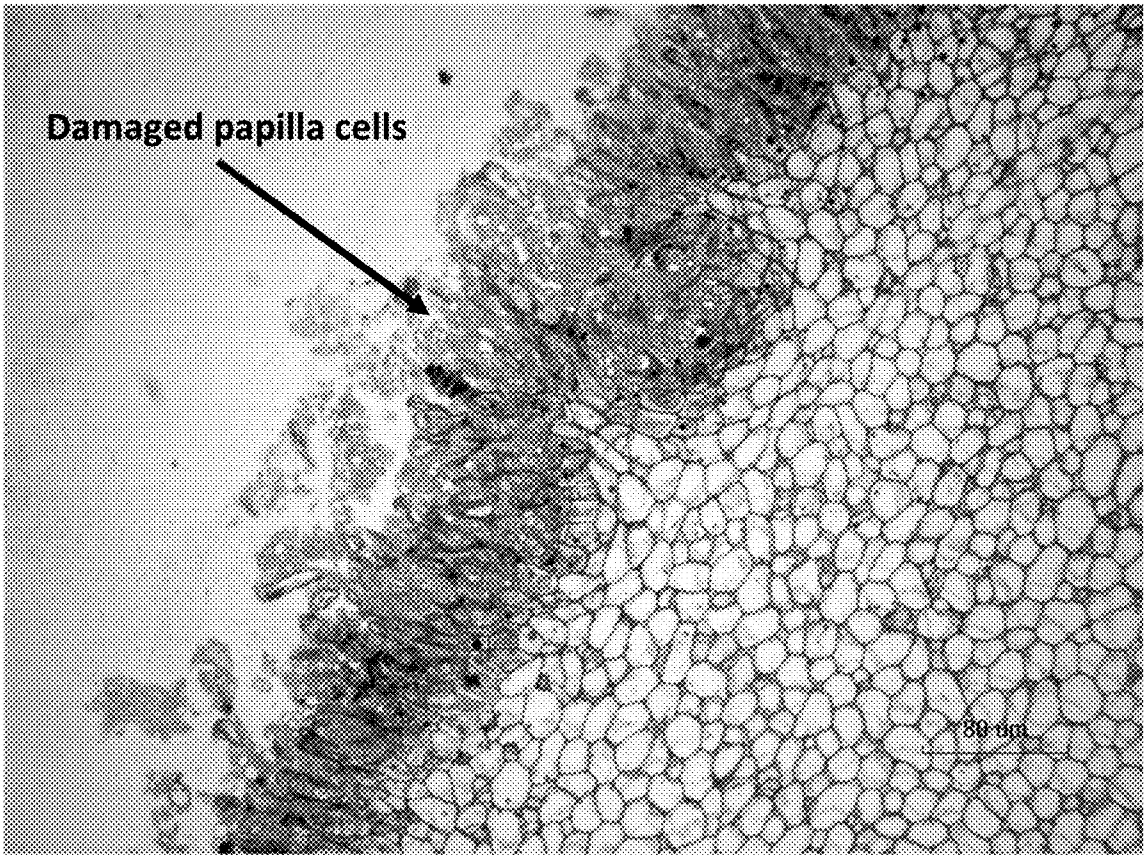
FIG. 6 depicts a view through a microscope of a semi-thin cut of a mandarin stigma treated exclusively with the active ingredient (sulphur), in which the papilla cells of the damaged stigma, without turgidity, can be seen.
Figure 7:
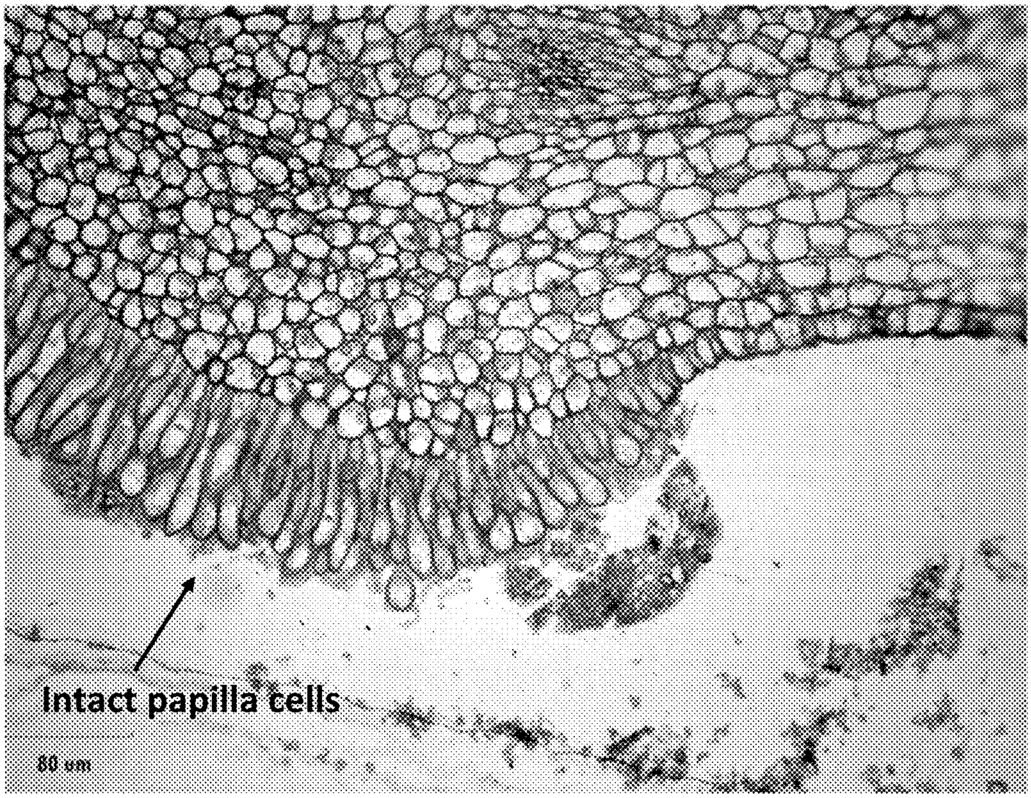
FIG. 7 depicts a view through a microscope of a semi-thin cut of a mandarin stigma treated exclusively with the gibberellic acid, in which the papilla cells of the stigma are good, functional and turgid.
Figure 8:
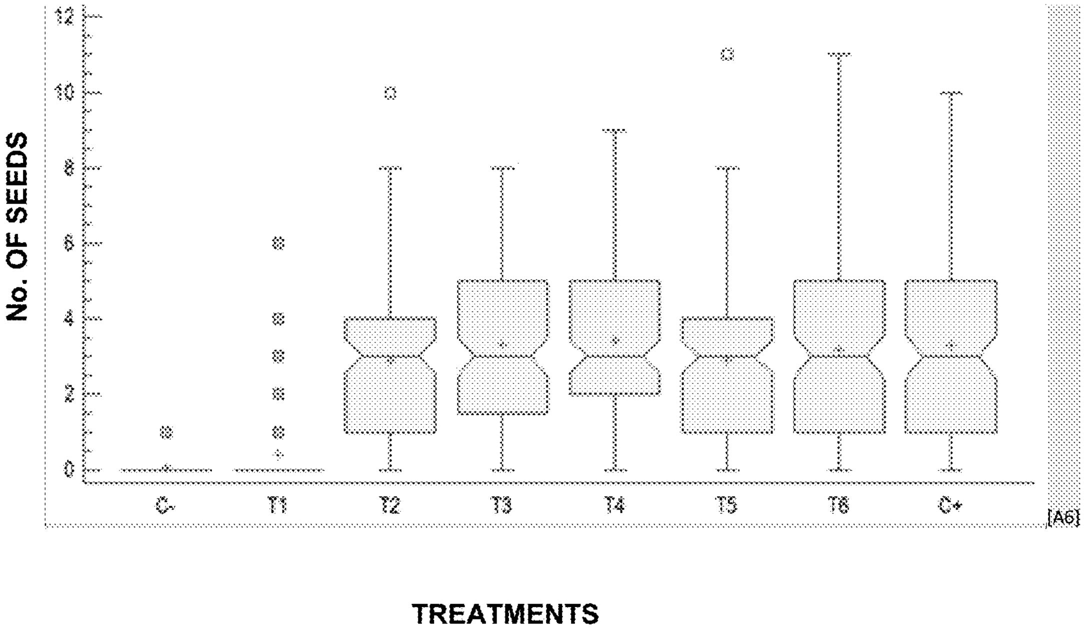
FIG. 8 depicts the results of an experiment where the effectiveness of 6 experimental products (T1-T6) are compared. Treatment 1 (T1) is the treatment with the active product described in the present invention and is the only one that significantly reduces the number of seeds compared to the positive control (C+) (from 3.3 to 0.4)

The active ingredient sulphur, preferably in the form of an octatomic molecule ($S_8$), is responsible for preventing the formation of seeds through the alteration of papilla cells of the stigma, whilst the GA is responsible for re-establishing the stimuli needed for the formation of the fruit, thus preventing a possible reduction in yield. The need for GA will depend on each crop and its parthenocarpic capacity. Despite initially suggesting that GA could reduce the number of seeds on its own[7], it has subsequently been verified that in real field conditions, applications with GA are not effective for reducing the number of seeds, there being no significant differences between control and treatments[1,2]. In that sense, gibberellic acid does not alter papilla cells, and so it does not intervene in the basic mechanism that prevents the appearance of seeds. This mechanism is substantially due to the effect of sulphur. This has been shown through FIGS. 4 and 5 where the stigmas of a mandarin have been pollinated and later treated, one with only the active ingredient ($S_8$) (FIG. 4), without pollen tubes, and the other with only GA (FIG. 5), where the developed pollen tubes can be clearly observed. The effect of the active ingredient (sulphur) and gibberellic acid (GA) on papilla cells can be compared separately in FIGS. 6 and 7 through semi-thin microscope cuts. FIG. 8 shows a semi-thin cut of the stigma of a mandarin flower exclusively treated with GA, where it can be seen that the papilla cells of the stigma are intact, functional and turgid; whereas in FIG. 6 the cells can be seen to be damaged by the application of sulphur. In other words, GA alone does not damage the papilla cells and thus does not impede the growth of pollen tubes.

The double effect of eliminating the seed and restoring the stimuli for the formation of fruit, must be done during the flowering phase (anthesis) and thus its combined and synchronised application ensures better results. The surfactant is needed to achieve a homogeneous and stable solution of the active ingredient in water, allowing it to be mixed with the third component (the plant hormone) and for its liquid application in the field through conventional atomisation machinery for agricultural treatment.

In accordance with the experimental work described hereafter, the authors of the present invention have been able to confirm that the application of the active product in accordance with the present invention produces very satisfactory results both when applied directly on the flower, achieving efficiencies of 95-100%, as well as when applied to the entire tree, with an approximate effectiveness of 85% in the results obtained for Nadorcott variety mandarin trees. The active product was simultaneously tested with another 5 possible experimental products, the active product being the only one to produce a significant reduction in the number of mandarin seeds (FIG. 8). In this experiment 3 inorganic fertilisers (T1=sulphur; T2=ammonium nitrate and T3=potassium nitrate) and 3 polysaccharides (T4=glucose; T5=cellulose; and T6=sucrose) were tested on entire trees of the Nadorcott variety (mandarin). Subsequently, 120 fruits of each treatment were collected and the number of seeds in each fruit were counted. The active product sulphur was the only one to significantly reduce the average number of seeds when compared to the positive control.

TABLE 1

Effect of the different treatments on the number of seeds in the fruit.

| Treatment | N | mean | KW | sd | se | skew | kurtosis | Shapiro |
|---|---|---|---|---|---|---|---|---|
| C− | 120 | 0.0666667 | d | 0.2504897 | 0.0228665 | 3.5185314 | 10.5557366 | 0.0000000 |
| C+ | 120 | 3.3000000 | ab | 2.3536133 | 0.2148545 | 0.5292717 | −0.3626865 | 0.0001237 |
| T1 | 120 | 0.4083333 | c | 0.9630140 | 0.0897365 | 3.0944794 | 11.0710305 | 0.0000000 |
| T2 | 105 | 2.8761905 | ab | 2.0833370 | 0.2033129 | 0.6816998 | 0.3845777 | 0.0000965 |
| T3 | 120 | 3.3333333 | ab | 2.2727222 | 0.2074702 | 0.3427928 | −0.8083911 | 0.0000836 |
| T4 | 120 | 3.4250000 | a | 2.2702404 | 0.2072436 | 0.5198690 | −0.2969133 | 0.0001655 |
| T5 | 120 | 2.9083333 | b | 2.1962376 | 0.2004881 | 0.7913286 | 0.6082522 | 0.0000109 |
| T6 | 120 | 3.1833333 | ab | 2.5003641 | 0.2282510 | 0.8966176 | 0.2212945 | 0.0000008 |

The Kruskal Wallis (KW) test was used to compare averages due to the non-normality of the residues.
Different letters represent significant differences.

The active product in accordance with the present invention also shows important benefits compared to other methods and products of the state of the art used for the same purposes. Specifically, the noteworthy benefits are:

- Greater effectiveness than the rest of agronomic treatments (more than double).
- Long-term effect and permanent action on treated crops: the treated flower is permanently dysfunctional for the growth of pollen tubes towards the inside of the ovary and thus incapable of forming seed throughout its useful life.
- Capacity to abort already initiated pollinations: the active product is capable of preventing fertilisation even when the pollen tube has travelled half its journey towards the ovule.
- It is non-toxic for the plant, in other words, at the recommended concentrations for each crop (for example, below 4% for *citrus* fruit), it does not produce necrosis, chlorosis or defoliation.
- It is non-toxic for pollinator insects, in particular, bumblebees.
- It has no significant effect on the size of the yield.
- It has no effect on fruit quality parameters: % peel, % juice, % pulp, vitamin C, Brix levels, total acidity, ripeness index, unit weight and colour of the fruit.

EXAMPLES

Example 1: Effectiveness of the Active Product on Different Crops

The active product has been tested on a multitude of crops, on different scales:

Flower: treatment on individual flowers and microscopic observation of fluorescence. In this case the presence or absence of pollen tubes (PT) in the stigma was assessed as was their percentage reduction compared to positive controls.

Fruit: treatment of individual flowers and subsequent observation of the fruit formed from the treated flower.

Tree: individual tree.

Field: treatments by tractor on entire rows of adult trees.

The results shown below confirm the effectiveness of the product as described in this report, as can be seen from the fluorescence microscope images in the corresponding Figures, in accordance with the following parameters: All of the flowers were first pollinated and then treated or not treated. C+=Positive control=flower pollinated but NOT treated with the active product; PT=Pollen tubes (fluorescent fibres); AP=Active product.

Figure 9A:
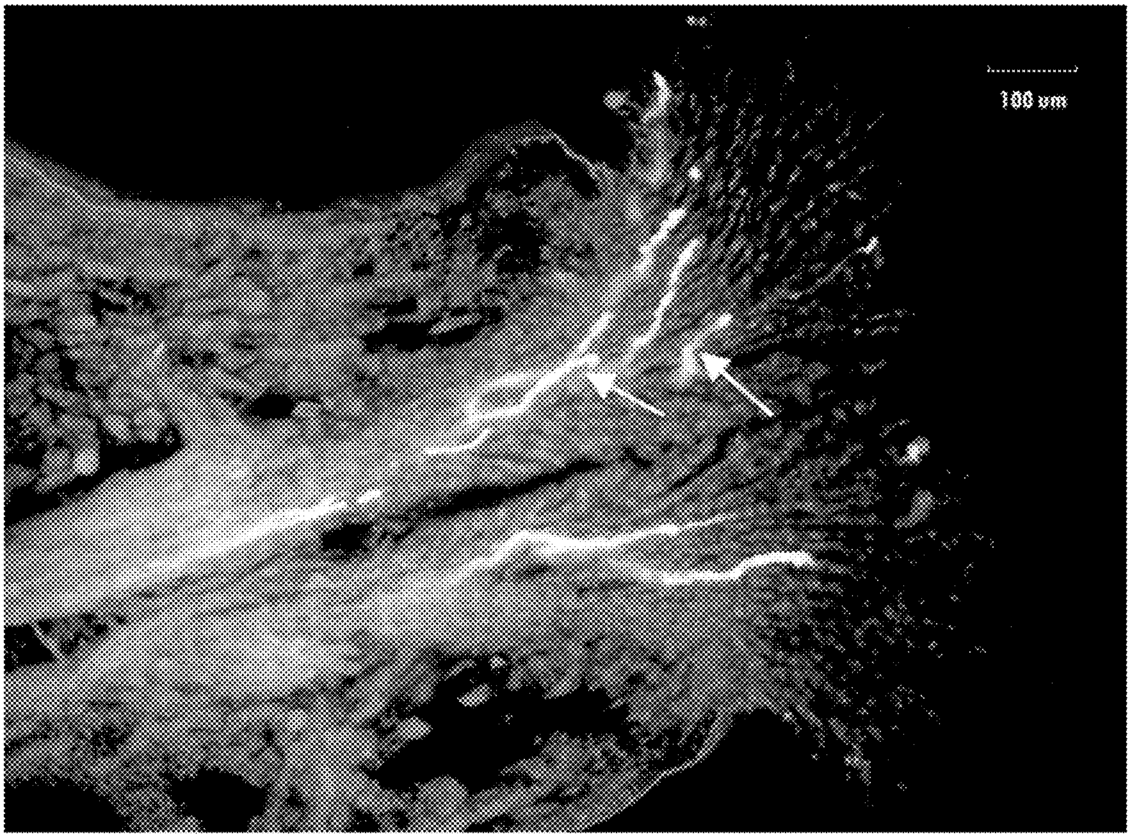
FIGS. 9A-9B depict fluorescence microscope images of grapes *Vitis vinifera* L.
Figure 9B:
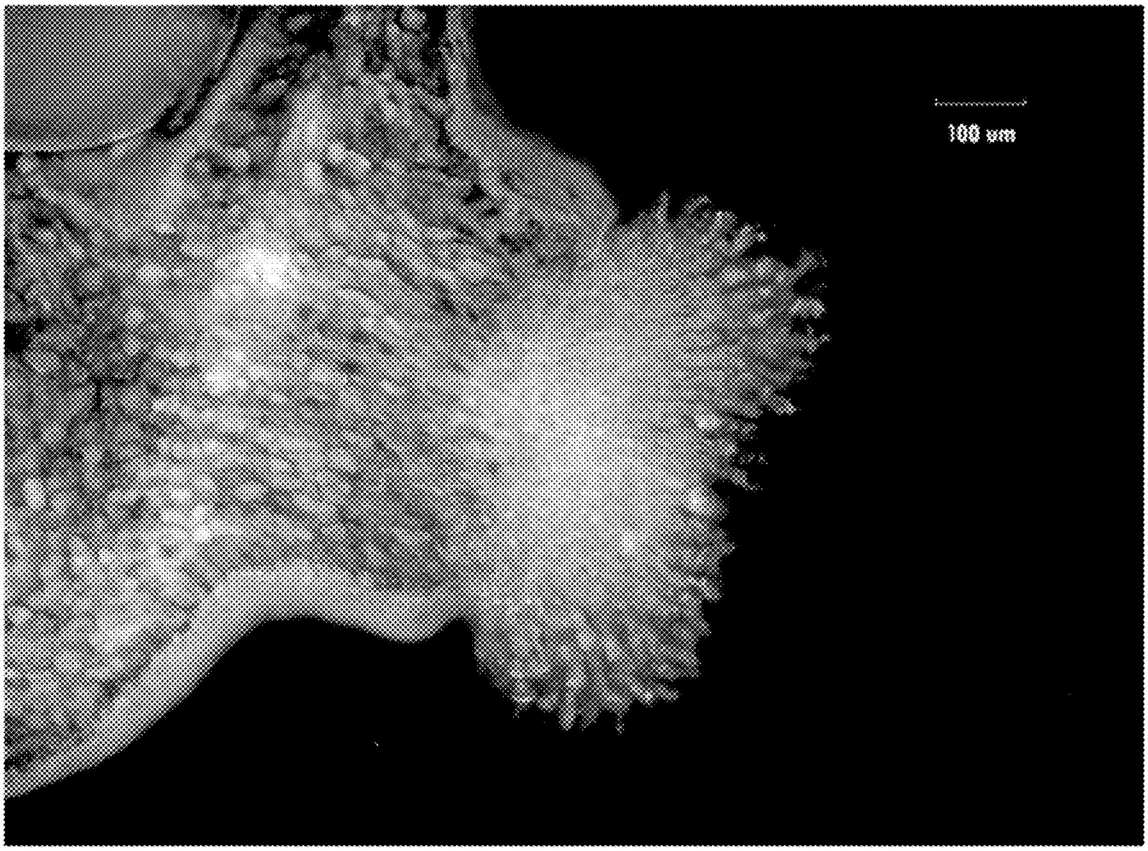
Figure 10A:
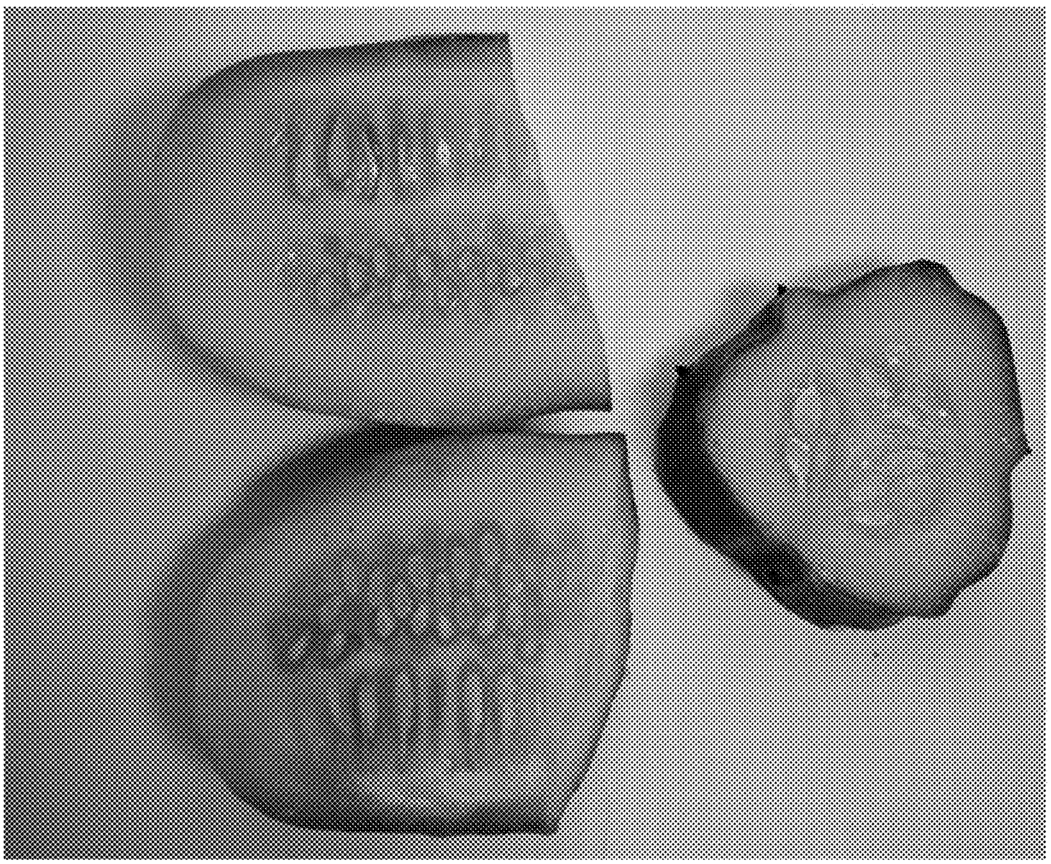
FIGS. 10A-10B depict images of cucumber fruit *Cucumis sativus* L.
Figure 10B:
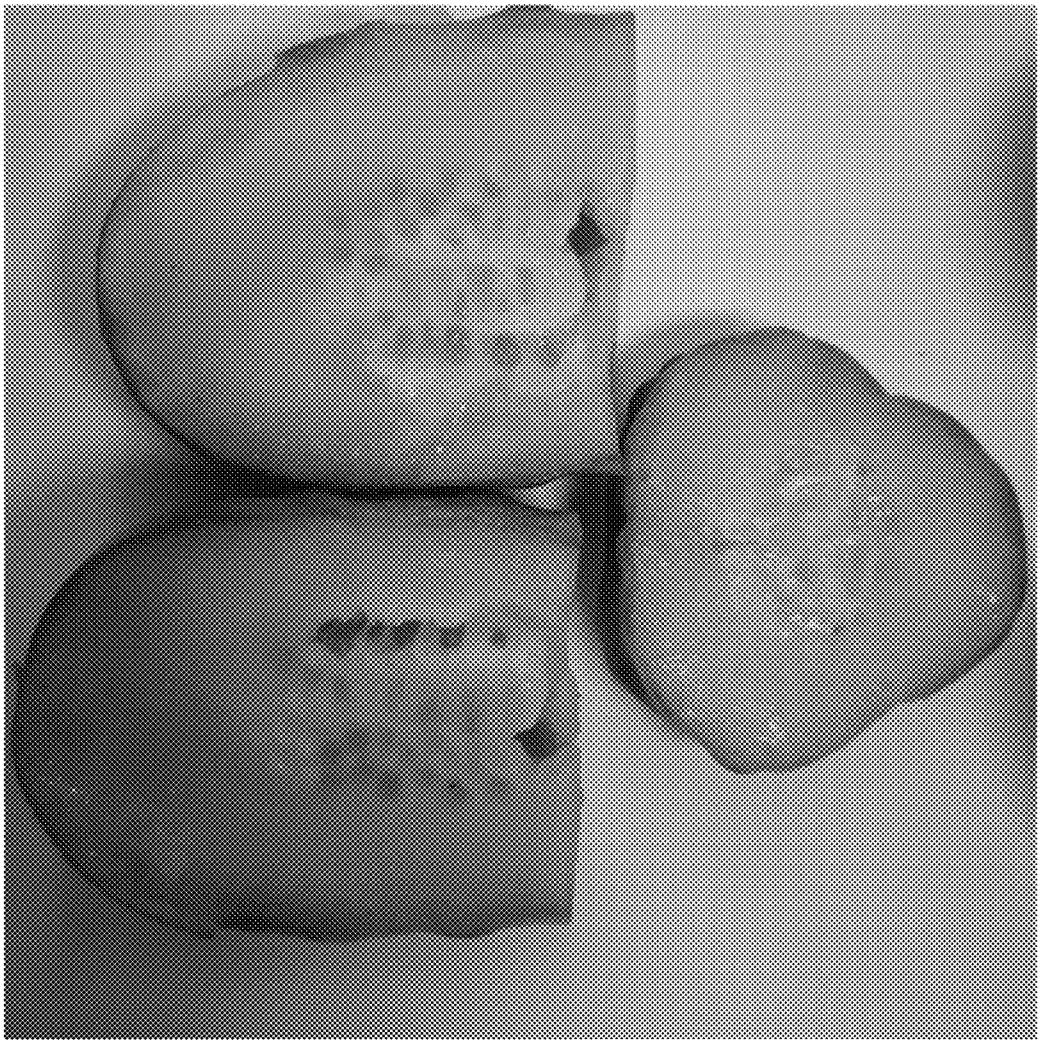

| | | | | |
|---|---|---|---|---|
| Vid | Flower | ($S_8$) | | = 100% red. of PT (FIG. 9A and 9B) |
| Vid | Flower | ($S_8$) | +PS20 + GA | = 100% red. of PT |
| Cucumber | Fruit | ($S_8$) | | = 100% red. seeds (FIG. 10A and 10B) |

-continued

Figure 11A:
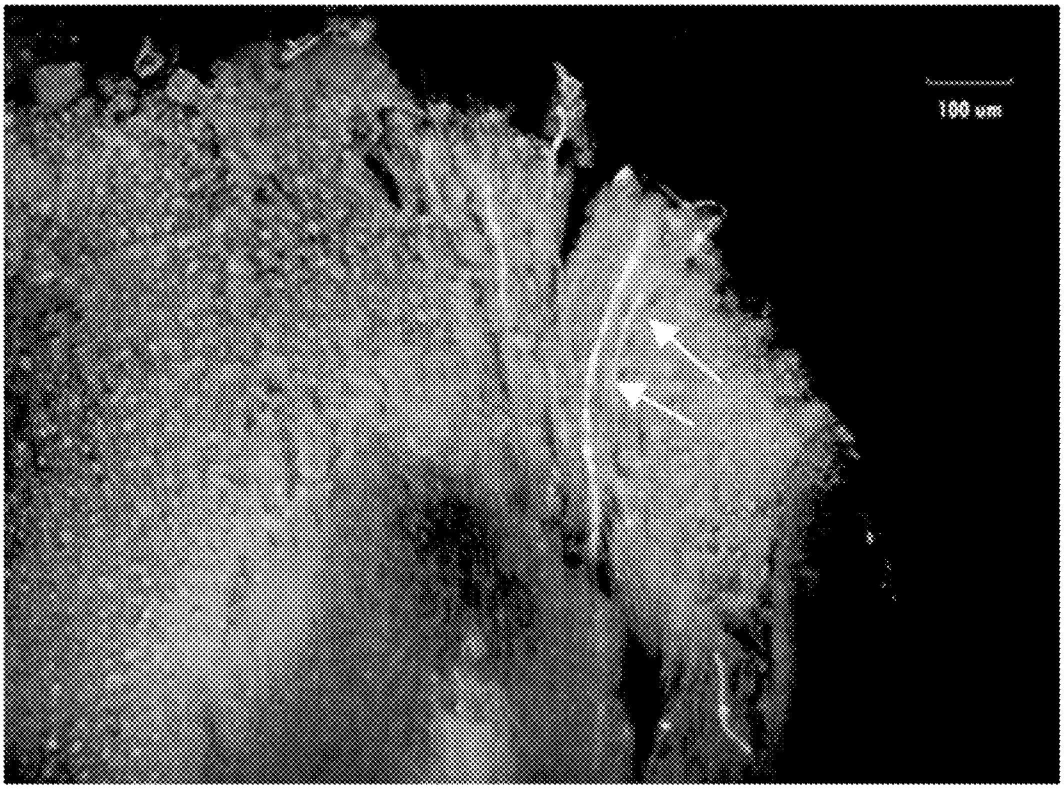
FIGS. 11A-11B depict fluorescence microscope images of aubergines *Solanum melongena* L.
Figure 11B:
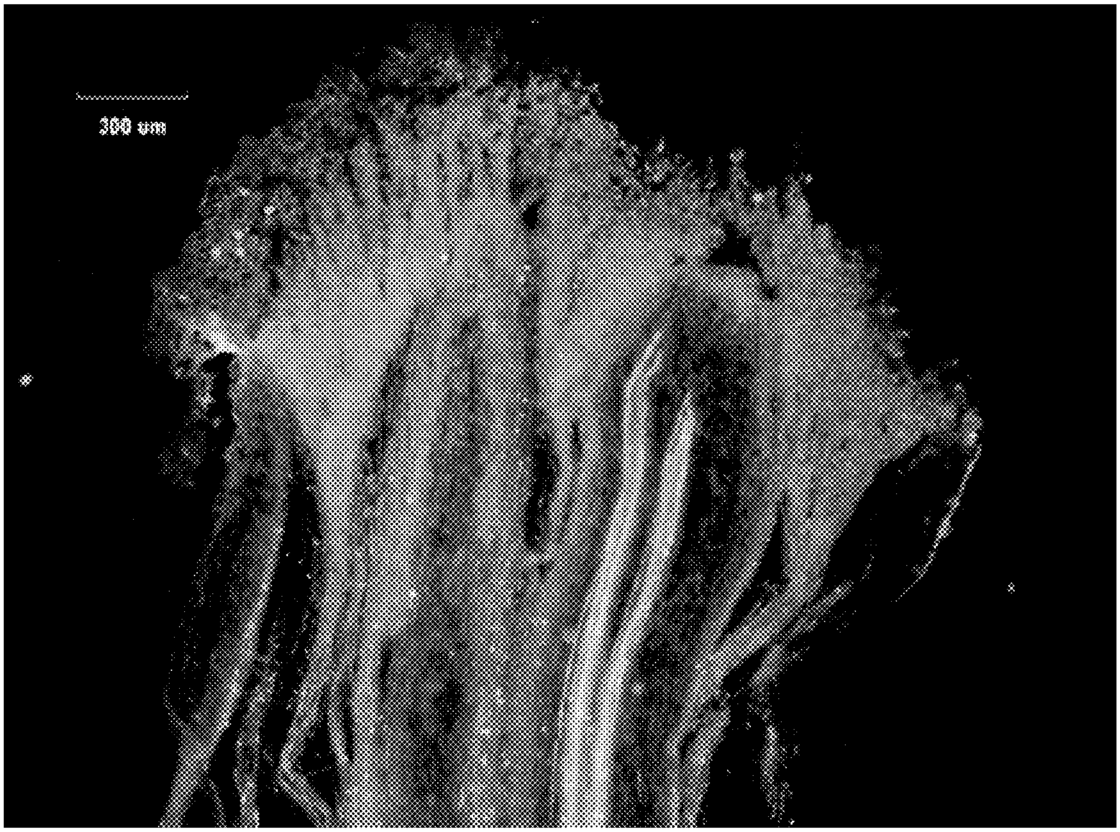
Figure 12A:
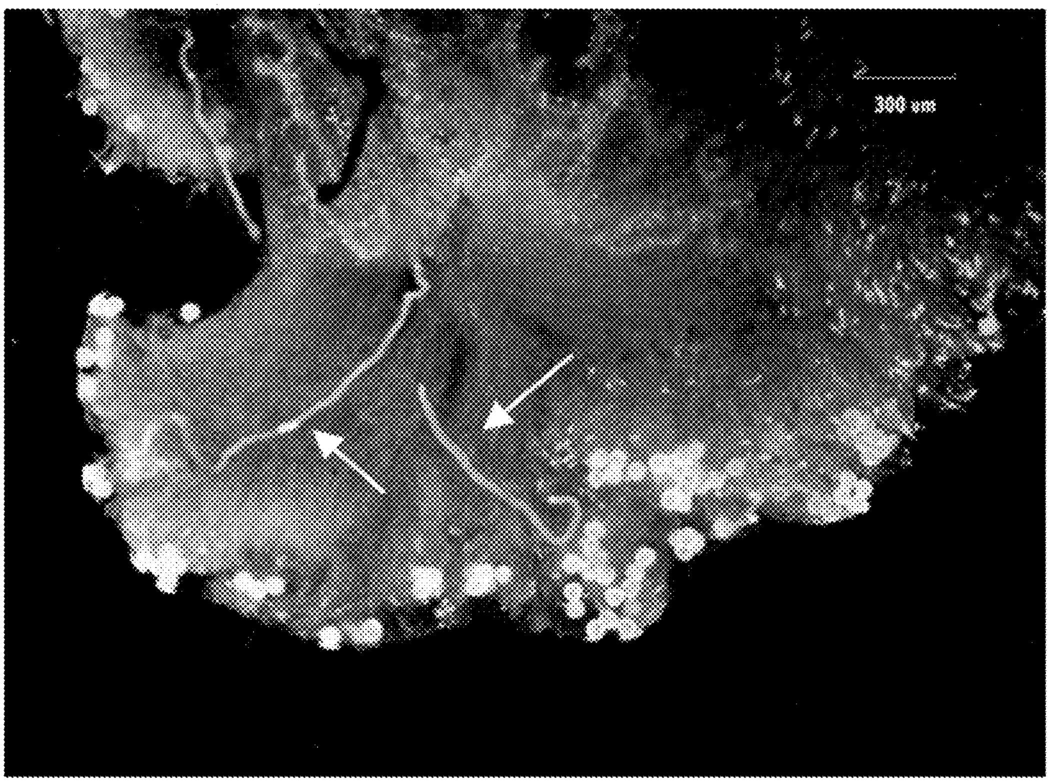
FIGS. 12A-12B depict fluorescence microscope images of watermelons *Citrullus lanatus* (Thunb.) Matsum. & Nakai.
Figure 12B:
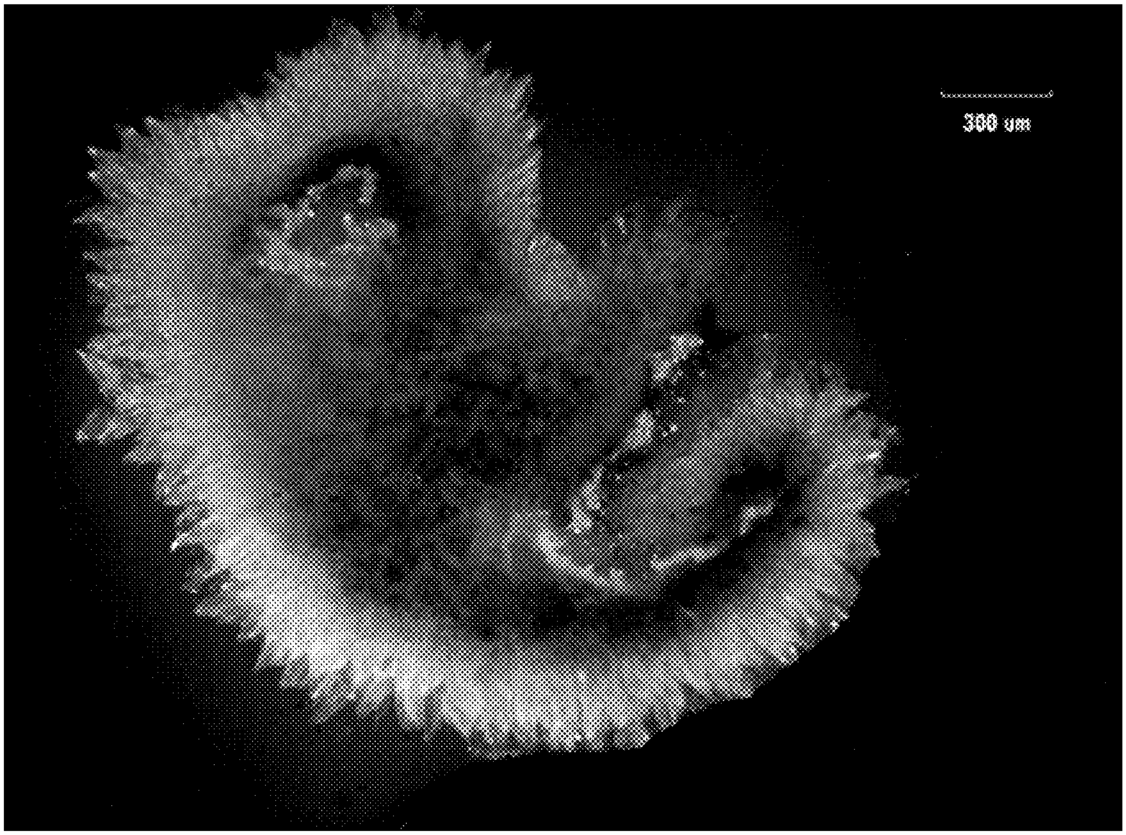
Figure 13A:
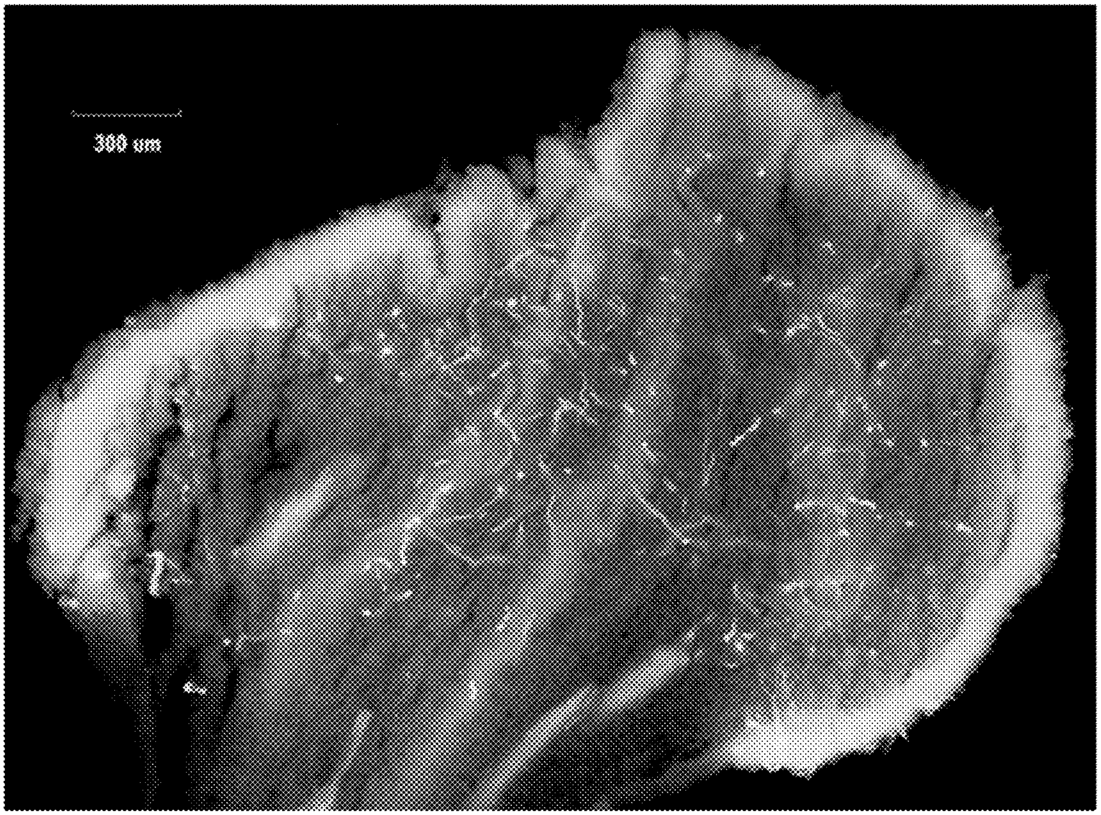
FIGS. 13A-13B depict fluorescence microscope images of clemenules *Citrus clementina* hort. Ex Tanaka.
Figure 13B:
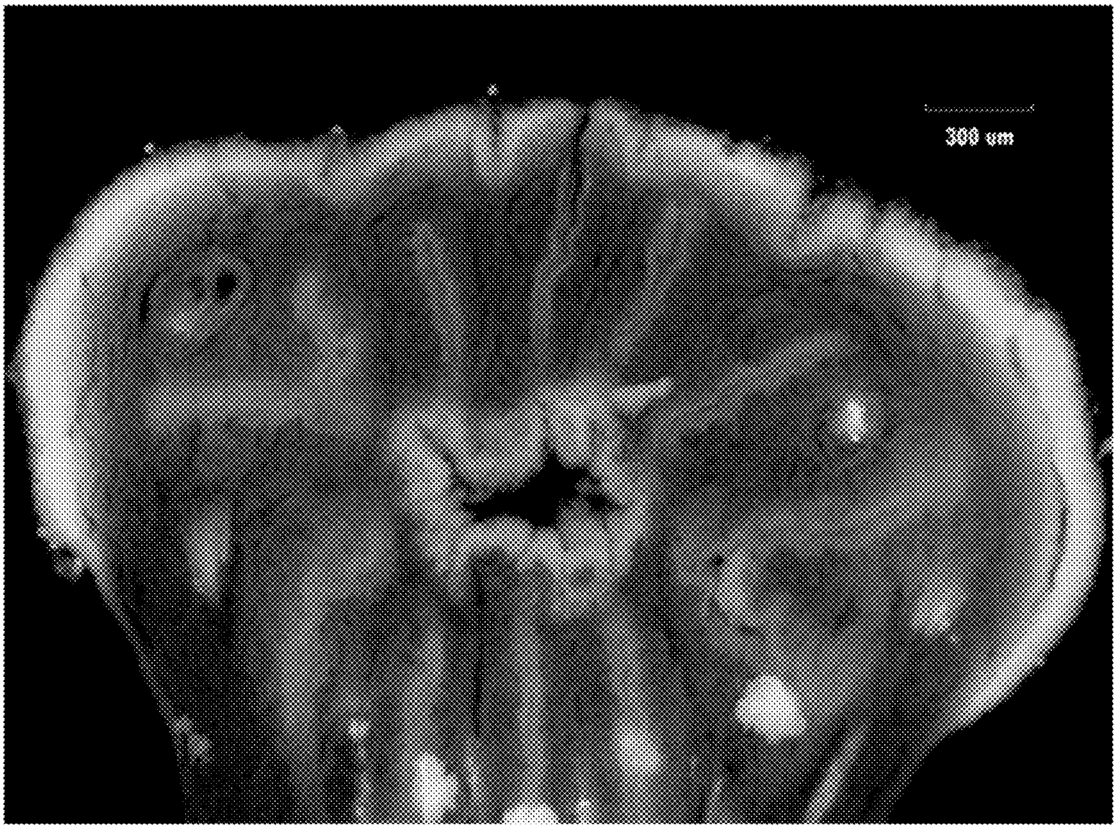
Figure 14A:
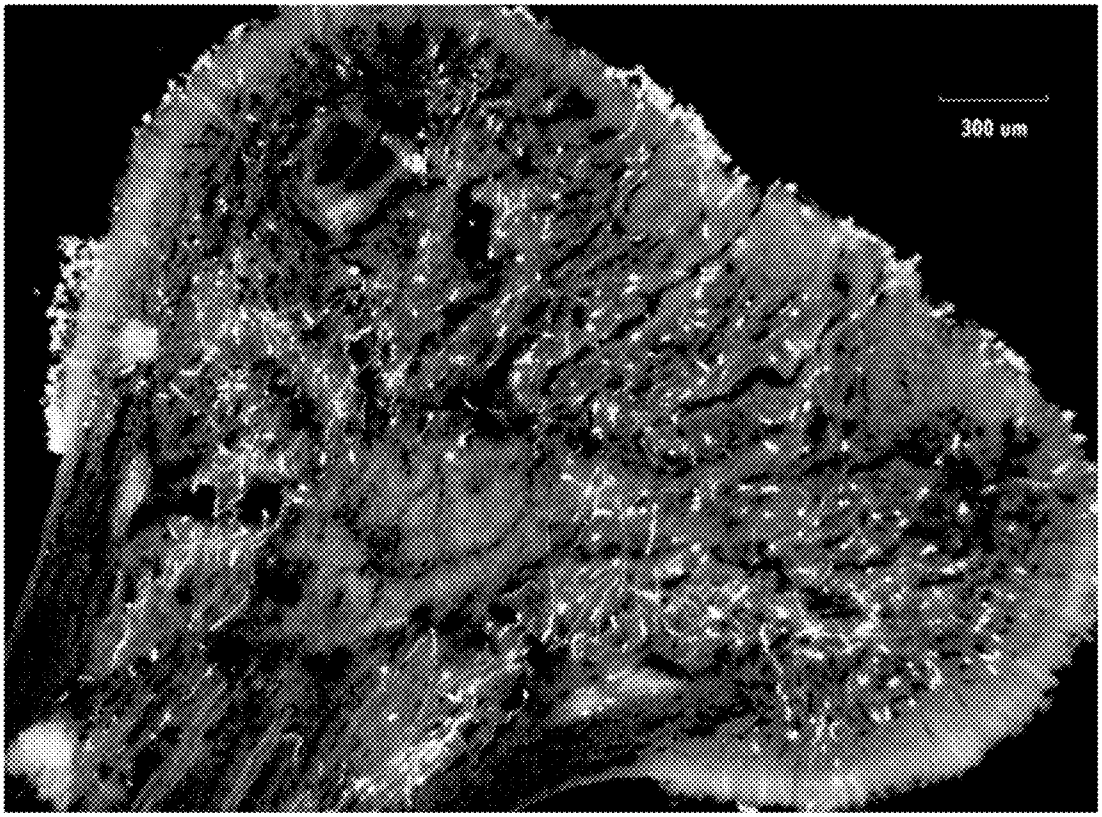
FIGS. 14A-14B depict fluorescence microscope images of *clementina fina Citrus clementina* hort. Ex Tanaka.
Figure 14B:
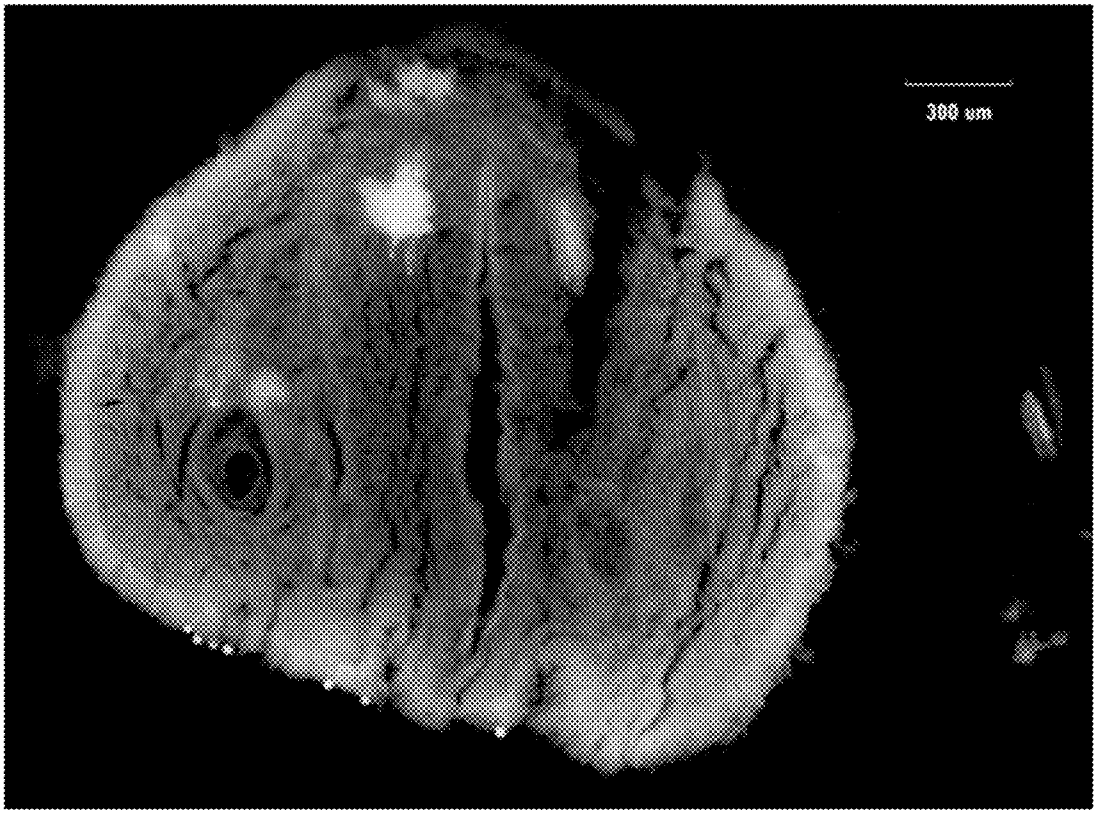
Figure 15A:
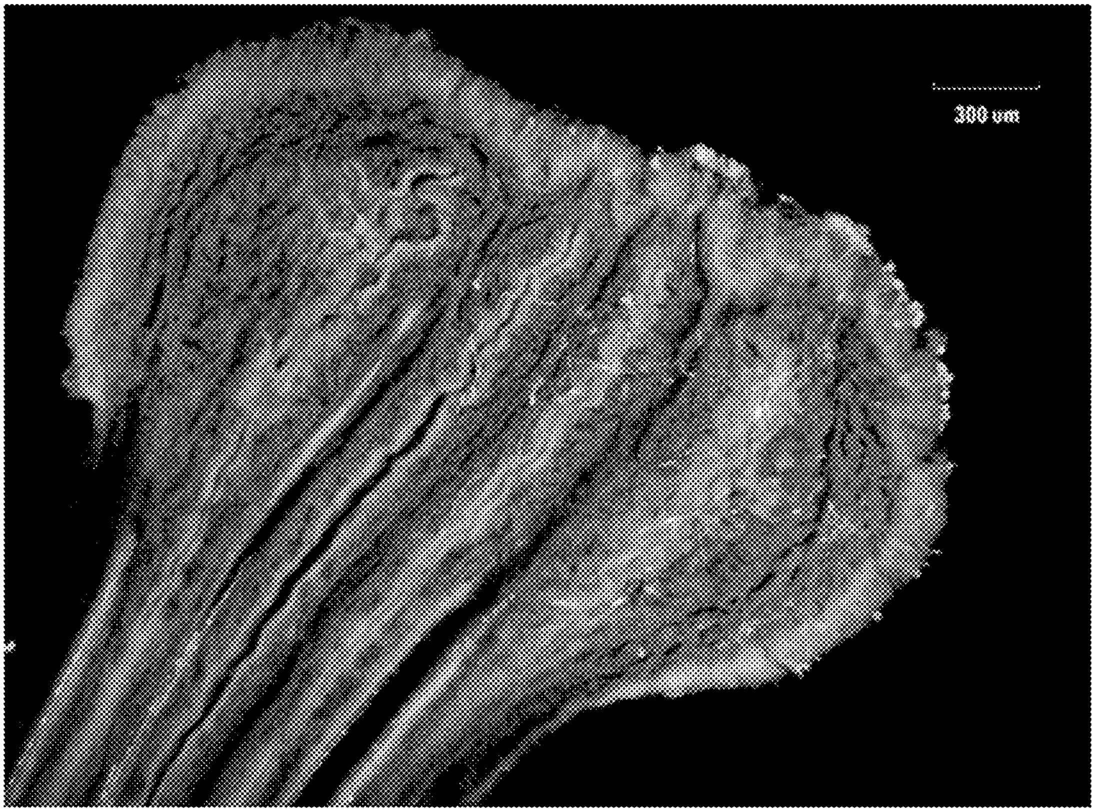
FIGS. 15A-15B depict fluorescence microscope images of Murcott *Citrus reticulata* White.
Figure 15B:
Figure 16A:
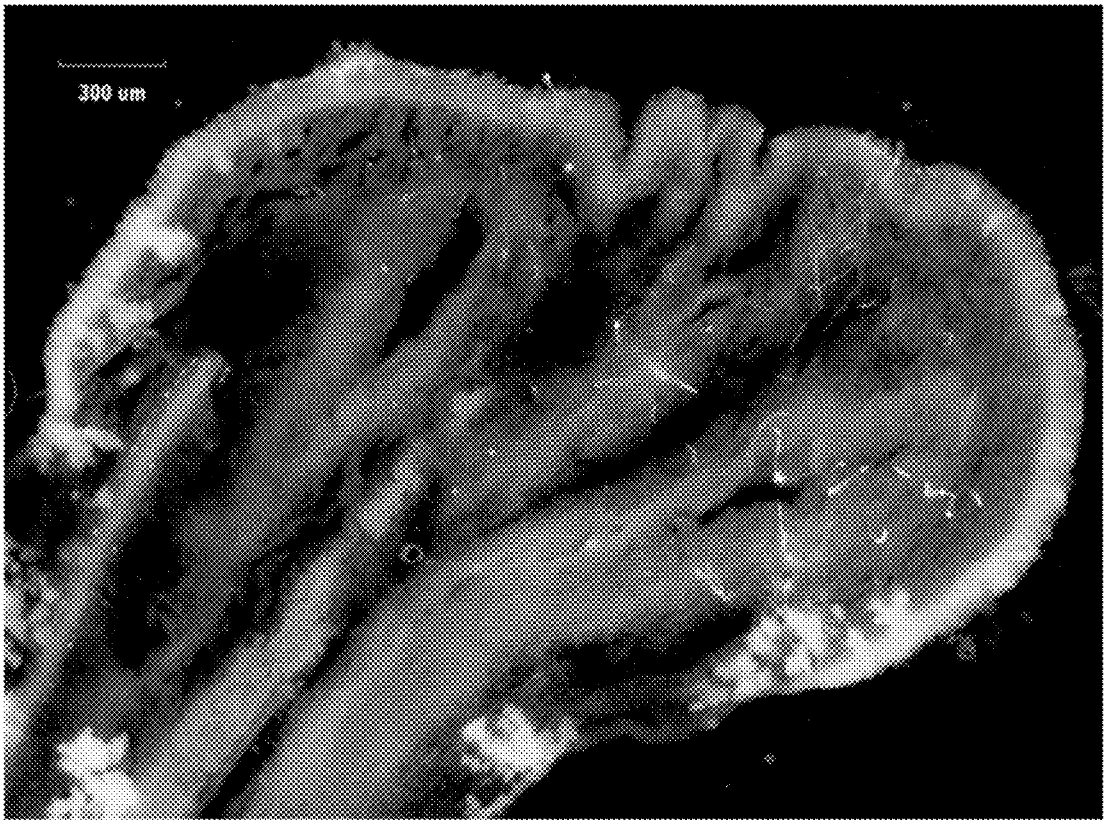
FIGS. 16A-16B depict fluorescence microscope images of Nova. *C. clementina*×[*C. paradisi*×*C. tangerina*].
Figure 16B:
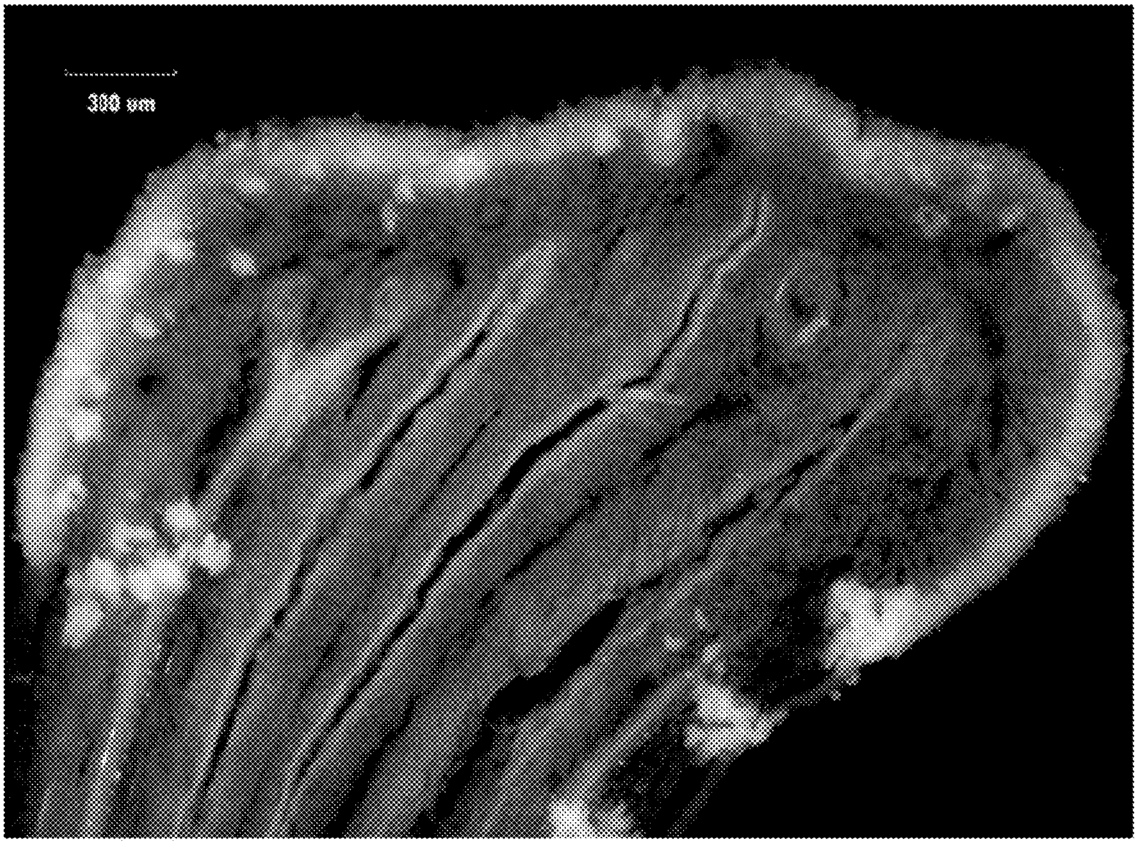
Figure 17A:
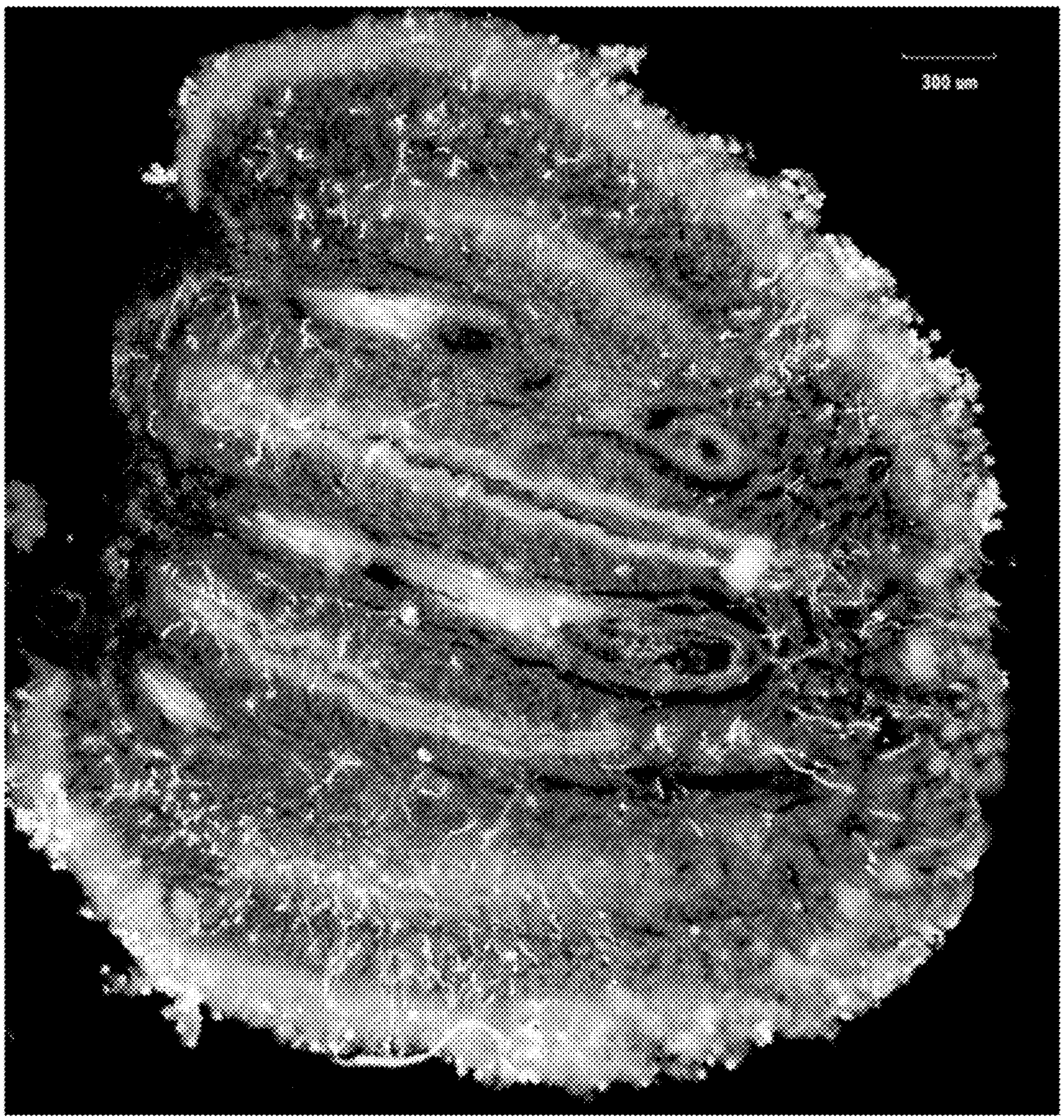
FIGS. 17A 17B depict fluorescence microscope images of lemons *Citrus limon* L. Burm. f.
Figure 17B:
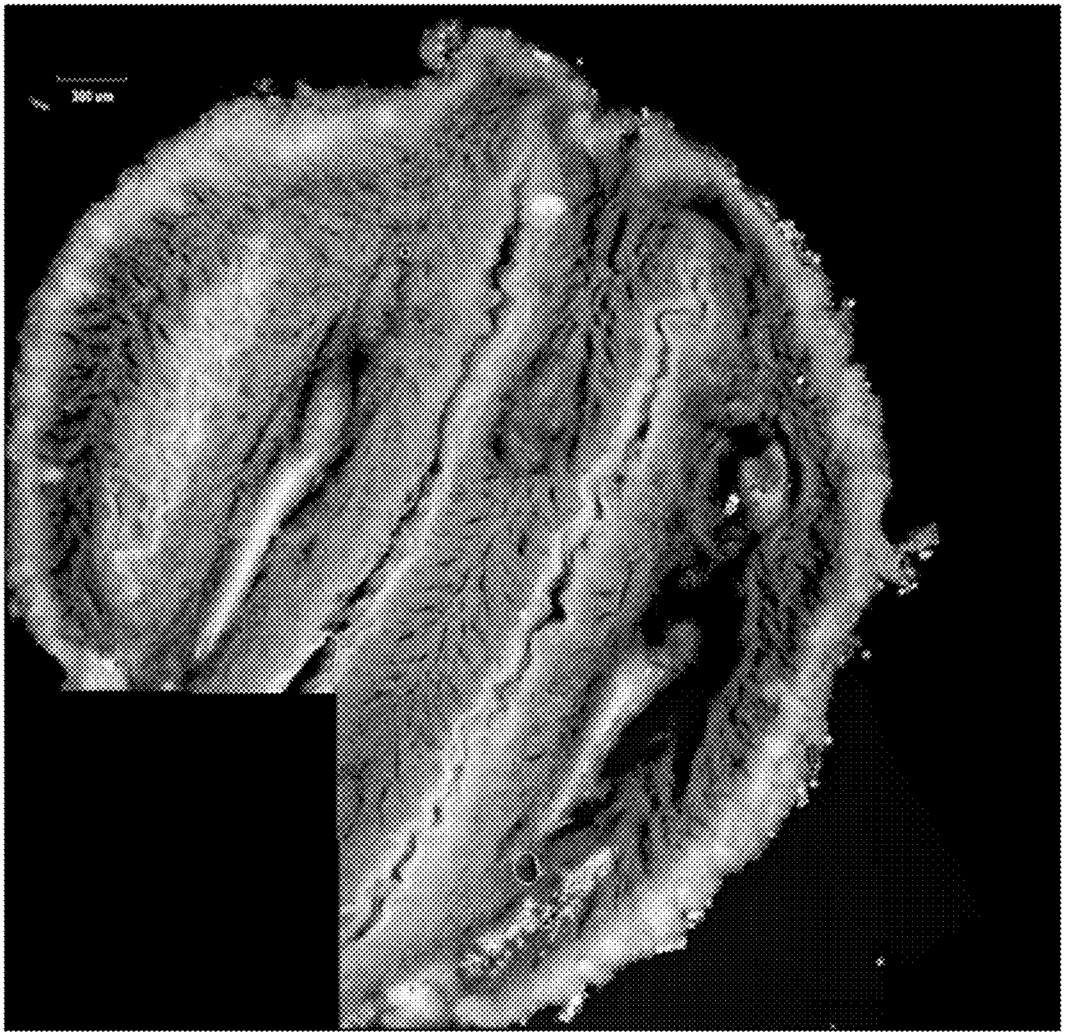
Figure 18:
FIG. 18 depicts fluorescence microscope images of orange tree. Pollinated flowers treated with AP. No visible PT.
Figure 19:
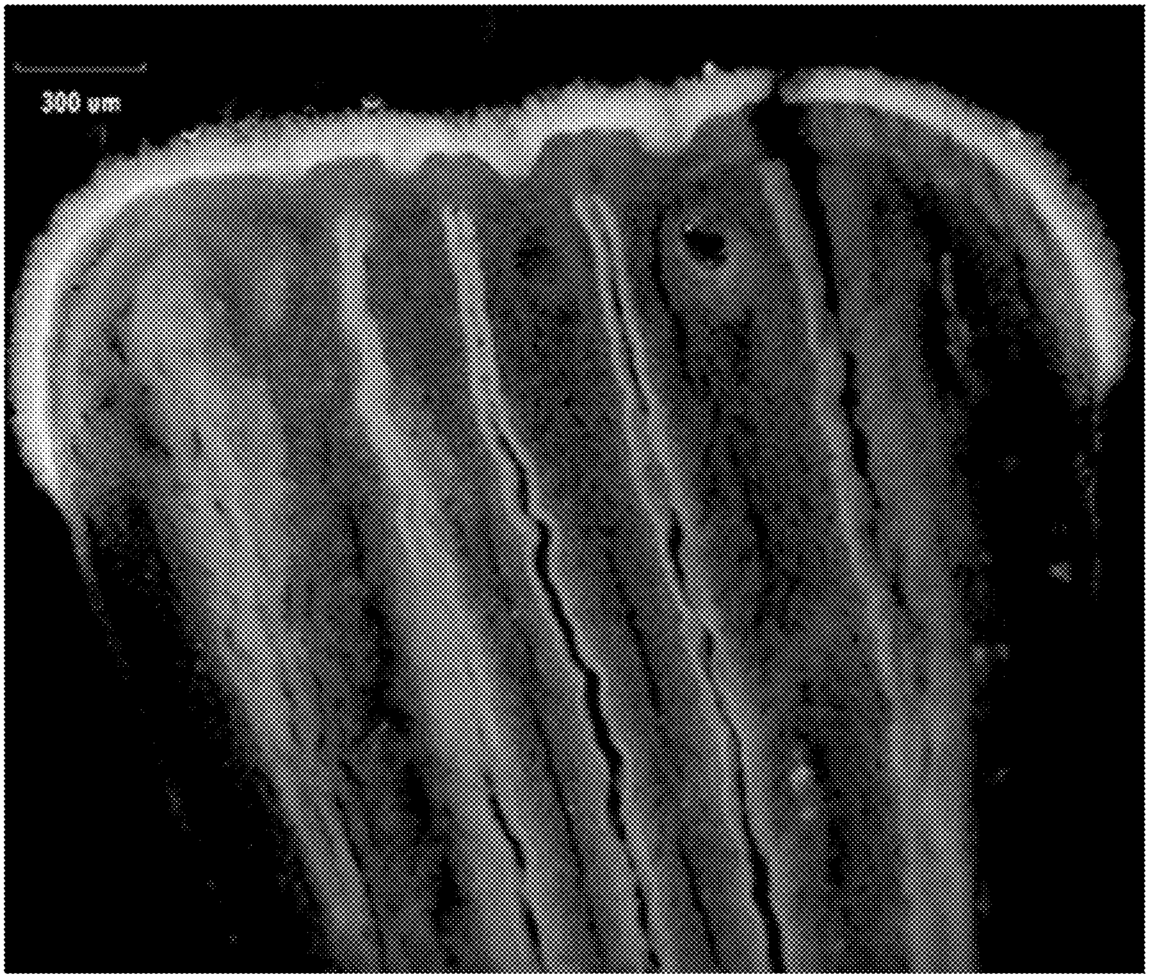
FIG. 19 depicts fluorescence microscope images of grapefruit tree. Pollinated flowers treated with AP. No visible PT.
Figure 20:
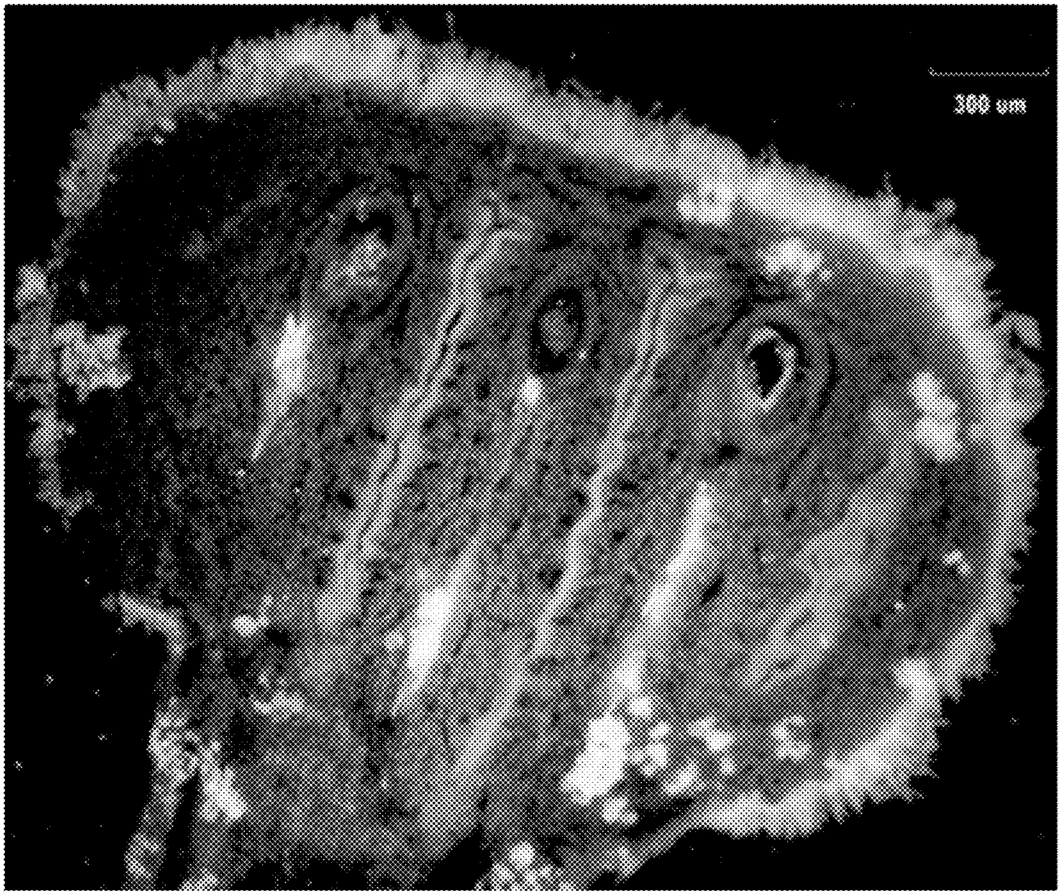
FIG. 20 depicts fluorescence microscope images of Mexican lime. Pollinated flowers treated with AP. No visible PT.

| | | | | |
|---|---|---|---|---|
| Cucumber | Fruit | ($S_8$) | +PS20 + GA | = 100% red. seeds |
| Aubergine | Fruit | ($S_8$) | | = 100% red. seeds (FIG. 11A and 11B) |
| Aubergine | Fruit | ($S_8$) | +PS20 + GA | = 100% red. seeds |
| Watermelon | Fruit | ($S_8$) | | = 100% red. of PT (FIG. 12A and 12B) |
| Watermelon | Fruit | ($S_8$) | +PS20 + GA | = 100% red. of PT |
| Nadorcott (mandarin) | Flower | ($S_8$) | | = 100% red. of PT |
| Nadorcott (mandarin) | Flower | ($S_8$) | +PS20 + GA | = 100% red. of PT |
| Nadorcott (mandarin) | Tree | ($S_8$) | | = 85% red. of seeds |
| Nadorcott (mandarin) | Field | ($S_8$) | +PS20 | = 81% red. of seeds |
| Clemenules (mandarin) | Flower | ($S_8$) | | = 100% red. of PT (FIG. 13A and 13B) |
| Clemenules (mandarin) | Flower | ($S_8$) | +PS20 + GA | = 100% red. of PT |
| Fina (mandarin) | Flower | ($S_8$) | | = 100% red. of PT (FIG. 14A and 14B) |
| Fina (mandarin) | Flower | ($S_8$) | +PS20 + GA | = 100% red. of PT |
| Murcott (mandarin) | Flower | ($S_8$) | | = 100% red. of PT (FIG. 15A and 15B) |
| Murcott (mandarin) | Flower | ($S_8$) | +PS20 + GA | = 100% red. of PT |
| Nova (tangelo) | Flower | ($S_8$) | | = 100% red. of PT (FIG. 16A and 16B) |
| Nova (tangelo) | Flower | ($S_8$) | +PS20 + GA | = 100% red. of PT |
| Lemon | Flower | ($S_8$) | | = 100% red. of PT (FIG. 17A and 17B) |
| Lemon | Flower | ($S_8$) | +PS20 + GA | = 100% red. of PT |
| Sweet orange | Flower | ($S_8$) | | = 100% red. of PT (FIG. 18) |
| Sweet orange | Flower | ($S_8$) | +PS20 + GA | = 100% red. of PT |
| Grapefruit | Flower | ($S_8$) | | = 100% red. of PT (FIG. 19) |
| Grapefruit | Flower | ($S_8$) | +PS20 + GA | = 100% red. of PT |
| Mexican lime | Flower | ($S_8$) | | = 100% red. of PT (FIG. 20) |
| Mexican lime | Flower | ($S_8$) | +PS20 + GA | = 100% red. of PT |

PS20 = polysorbate 20
GA = gibberellic acid
red. = reduction
PT = pollen tube

Example 2: Experiments on the Action Over Time of the Active Product of the Invention In order to study the action over time of the product, two experiments were carried out on the flowers of the Nadorcott mandarin, one pre-pollination and the other post-pollination. In the pre-pollination experiment 300 flowers were treated with the product of the invention ($S_8$) and subsequently pollinated in batches. One batch was pollinated on the same day (D0) and another batch the following day (D1), and so on successively until D9.

Figure 21A:
FIGS. 21A and 21B depict the results of the action of the active product of the present invention in the fruit over time, number of seeds x treatment (FIG. 21A (pre-pollination treatment) and FIG. 21B (post-pollination treatment)

Results: in FIG. 21A the positive control (C+) presented an average of 4.67 seeds, whereas the fruit in the rest of the treatments from D0 to D9 did not present a single seed. This shows that the action of the product is permanent: once the flower has been treated with the product, even if it receives pollen in subsequent days (1-9), it is permanently disabled from forming seeds.

In the post-pollination experiment 360 flowers were first pollinated. In this case, after first having been pollinated a batch was treated with the product on the same day (D0), another batch the following day (D1) and so on successively until day 9 (D9).

Figure 21B:
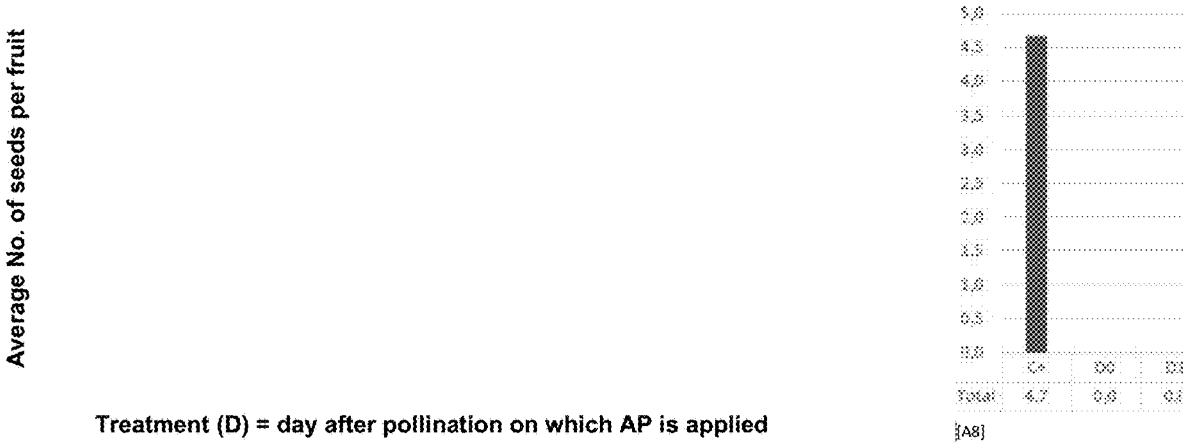

Results: FIG. 21B shows that the fruit of the positive Control (C+) contained 4.7 seeds on average. The active product was able to prevent 100% of the seeds (despite the pollen being under development) during the first 4 days (D0 to D3), and approximately 50% of the seeds during the following 6 days (D4-D9).

Example 3: Experiment on the Effect of Applying the Active Product of the Present Invention to the Germination of Pollen Grains The action of the product on the germination of pollen grains was studied. To that end, pollen grains were sown on Petri dishes in laboratory conditions to which growing medium increasing concentrations of the active product ($S_8$) were added. After 72 hours they were assessed and the number of germinated pollen grains were counted on each Petri dish.

A non-toxic, neutral product (sample), $KNO_3$ was used for comparing the results with those obtained from the active product (AP).

Figure 22:
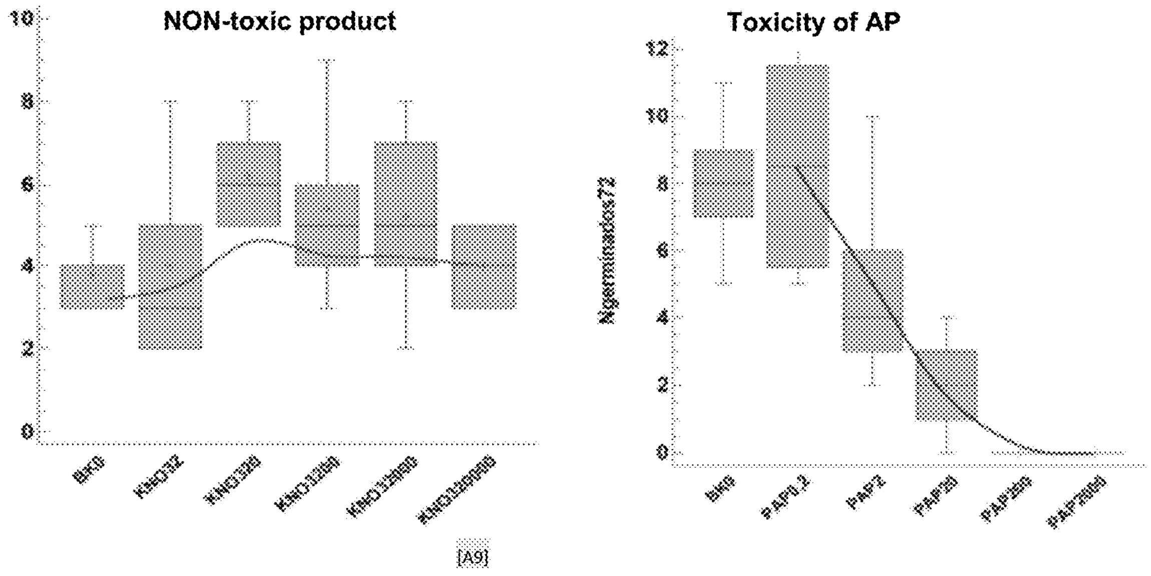
FIG. 22 shows the toxicity curve with respect to the effect of applying the active product during the germination of pollen grains.

Results: As shown in FIG. 22 the active product has an inhibitive effect on the germination of pollen grains. The toxicity curve starts at 2, 20, 200, and inhibition is total at 2000 mg/l.

Example 4: Experiment on Phyto-Toxicity

Phyto-toxicity tests were performed on adult trees of the Nadorcott mandarin variety. The trees were sprayed with different concentrations of the active product ($S_8$). The level of affection on chlorosis, necrosis and defoliation was assessed, on a scale of 1 to 6, with 1 being very low and 6 being very high.

Figure 23:
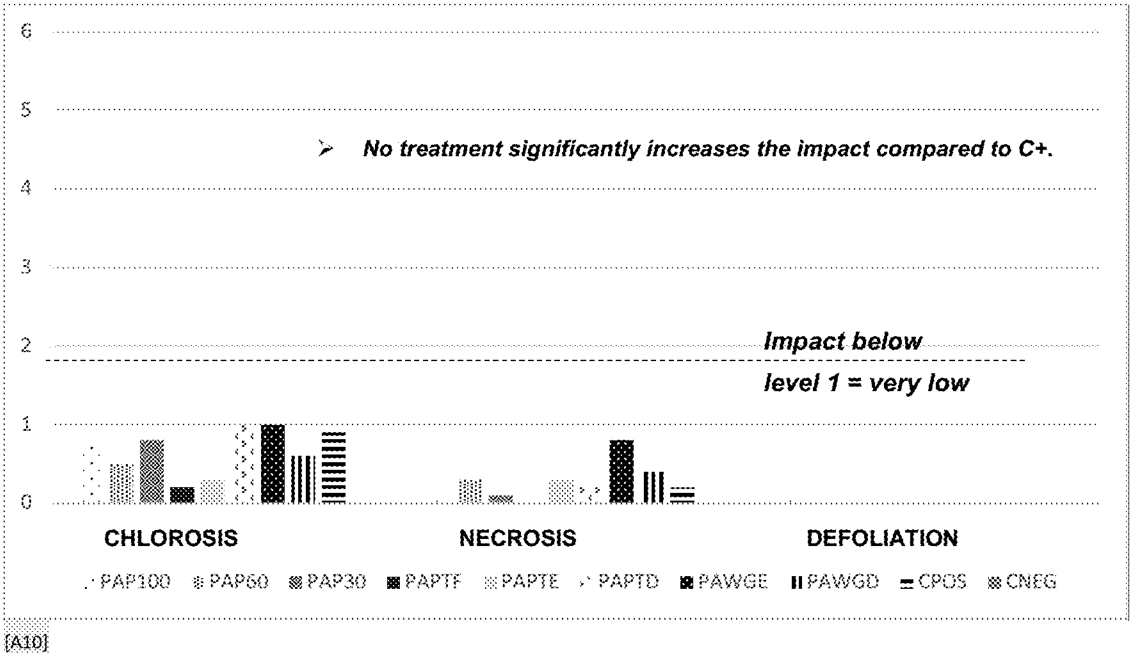
FIG. 23 shows the phytotoxicity in trees after applying the active product of the present invention.

Results: as shown in FIG. 23, preliminary tests show that the active product is not phyto-toxic for mandarins at the recommended concentrations (below 4%). At these concentrations there are no signs of chlorosis, necrosis or defoliation.

Example 5: Experiment on the Effects of the Active Ingredient on Pollinators The experiments for studying the effects of the product on pollinators were performed in the laboratory on the common bumblebee (*Bombus* sp.) following official protocols. The total number of bumblebees used for the experiments was 560.

Results: FIG. 22A shows the frequency of mortality at 48 h depending on the treatment. The first 4 treatments do not present significant difference with the control ($H_2O$) and show a mortality rate of between 14 and 18%, far below the 50% characteristic of Lethal Dose 50 (LD50). PAP_10 represents 1000 μg/bumblebee.

International scale establishes: —highly toxic (acute LD50<2 μg/bee)—moderately toxic (acute LD50 2-10.99 μg/bee)—slightly toxic (acute LD50 11-100 μg/bee)—non-toxic (acute LD50>100 μg/bee).

In other words, if the LD50 is over 100 μg/bumblebee it is classified as "non-toxic". In this case a dose of 1000 μg/bumblebee continues to not kill 50% of the individuals of the population. It is treatment PAP_1000 which produces a mortality of 50% of bumblebees, and is comparable to MCP (chlorpyrifos-methyl treatment: an insecticide used as negative control). Therefore, a concentration of 100,000 μg/bumblebee is needed to produce a mortality of 50% and therefore the active ingredient can be classified as "non-toxic" for bumblebees.

Figure 24A:
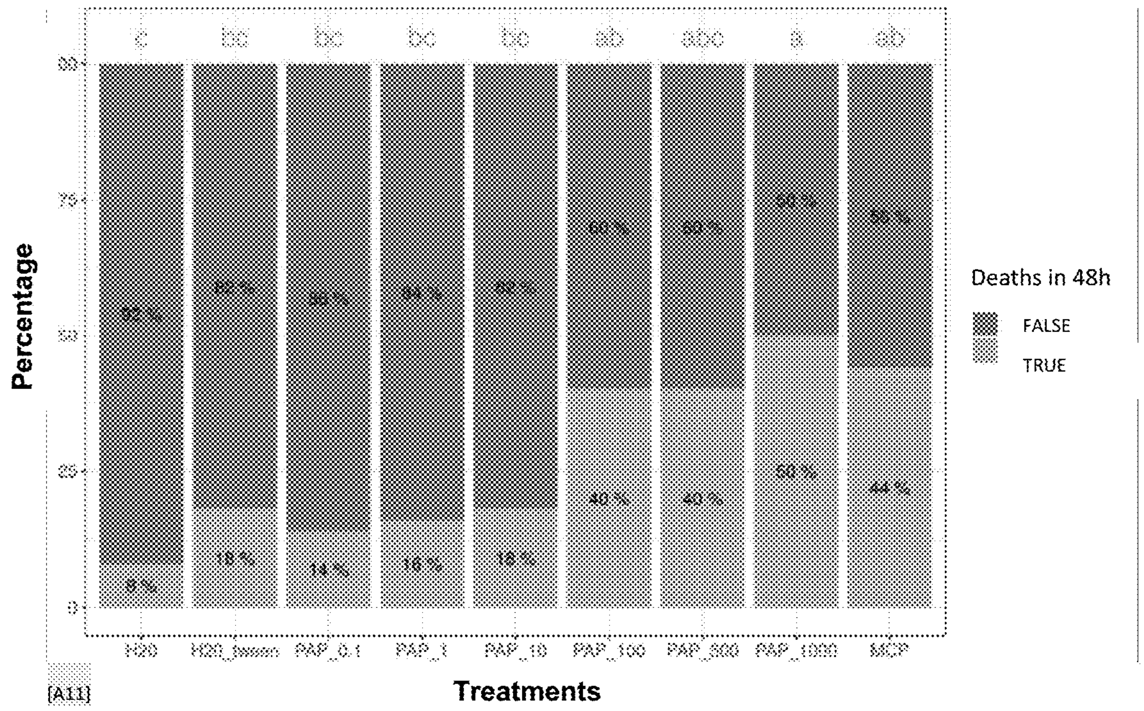
FIGS. 24A-24B show the effect of the active product on pollinators.
Figure 24B:
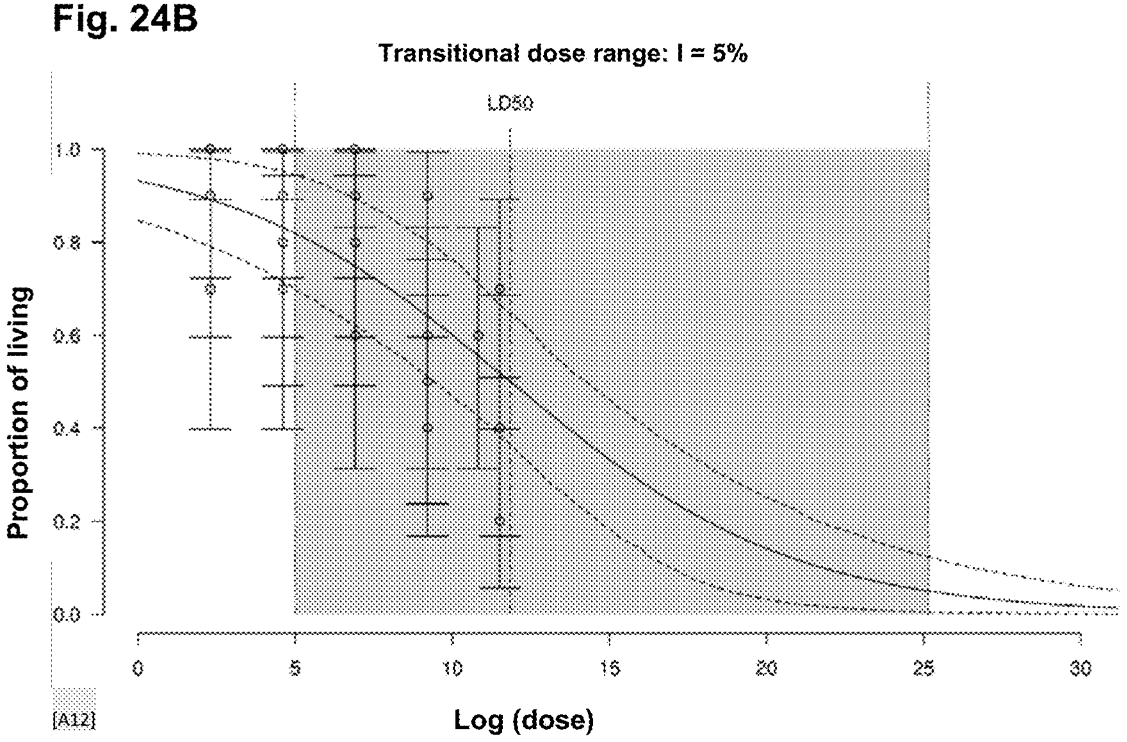

FIG. 24B shows the adaptation of the logistic model. The model provides LD50=139,017 μg/bumblebee, which coincides with FIG. 24A in terms of mortality rate (PAP_1000).

Example 6: Experiment on the Effects of the Active Product on the Yield

The effect of the total volume of the yield per mandarin tree was measured in a field experiment, performed with a tractor on entire rows of adult Nadorcott mandarin trees and with 3 increasing concentrations of the active product ($S_8$+ polysorbate 20 1:1) (D, E and F). Yield was measured for 56 entire trees.

TABLE 2

Results of the Anova of yields after each treatment.

| Treatment | N | mean | HSD | sd | se | skew | kurtosis | Shapiro |
|---|---|---|---|---|---|---|---|---|
| C + LIQUID | 14 | 124.2986 | a | 53.01118 | 14.167833 | −0.8604538 | 0.9903271 | 0.2010698 |
| PAPT D | 14 | 115.7464 | a | 30.42040 | 8.130193 | −2.3258217 | 6.6905484 | 0.0017355 |
| PAPT E | 14 | 132.1971 | a | 28.10502 | 6.976860 | 0.5955203 | −0.1313294 | 0.7445156 |
| PAPT F | 14 | 103.0243 | a | 38.76952 | 10.361590 | −1.3009118 | 3.1012707 | 0.1249301 |

Figure 25:
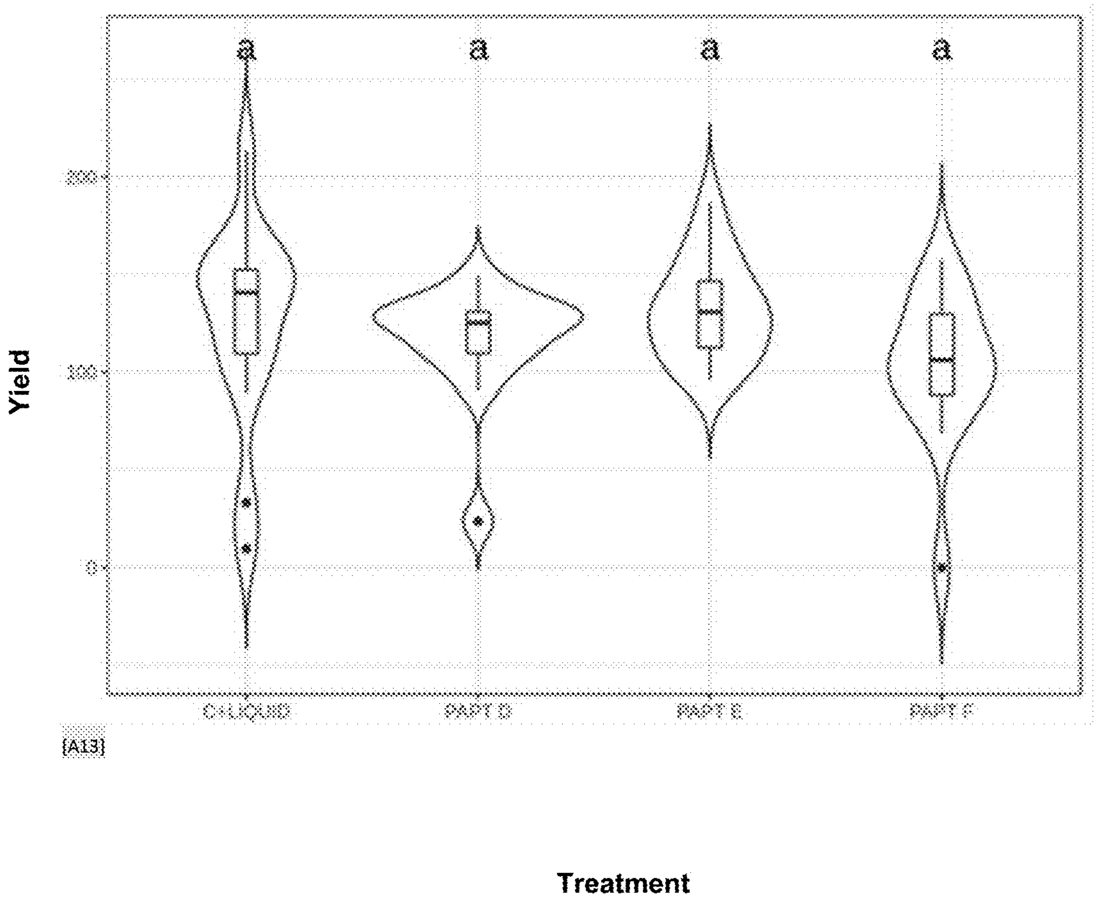
FIG. 25 shows the effect of the active product on the size of the yield, after treatment with the active product.

Results: Table 2 and FIG. 25 show that there are no significant differences in the total yield between treatments as the HSD test of all treatments show the same letter "a".

The quality parameters of the yield were measure in the experiment "tree 2017" on the treatment of young Nadorcott mandarin trees. Measurements were taken from 48 mandarins per treatment. Each column represents a different treatment.

Figure 26A:
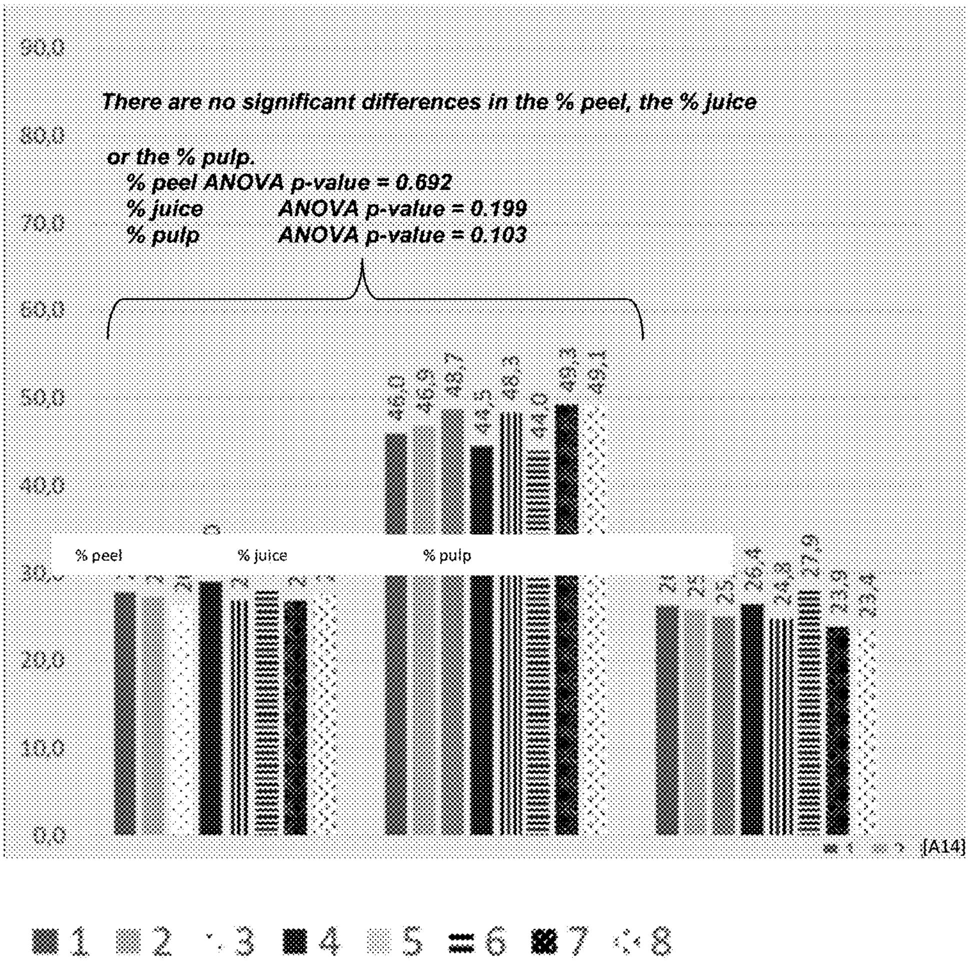
FIGS. 26A-26C show the effect of the action of the active product on the quality of the yield.
Figure 26B:
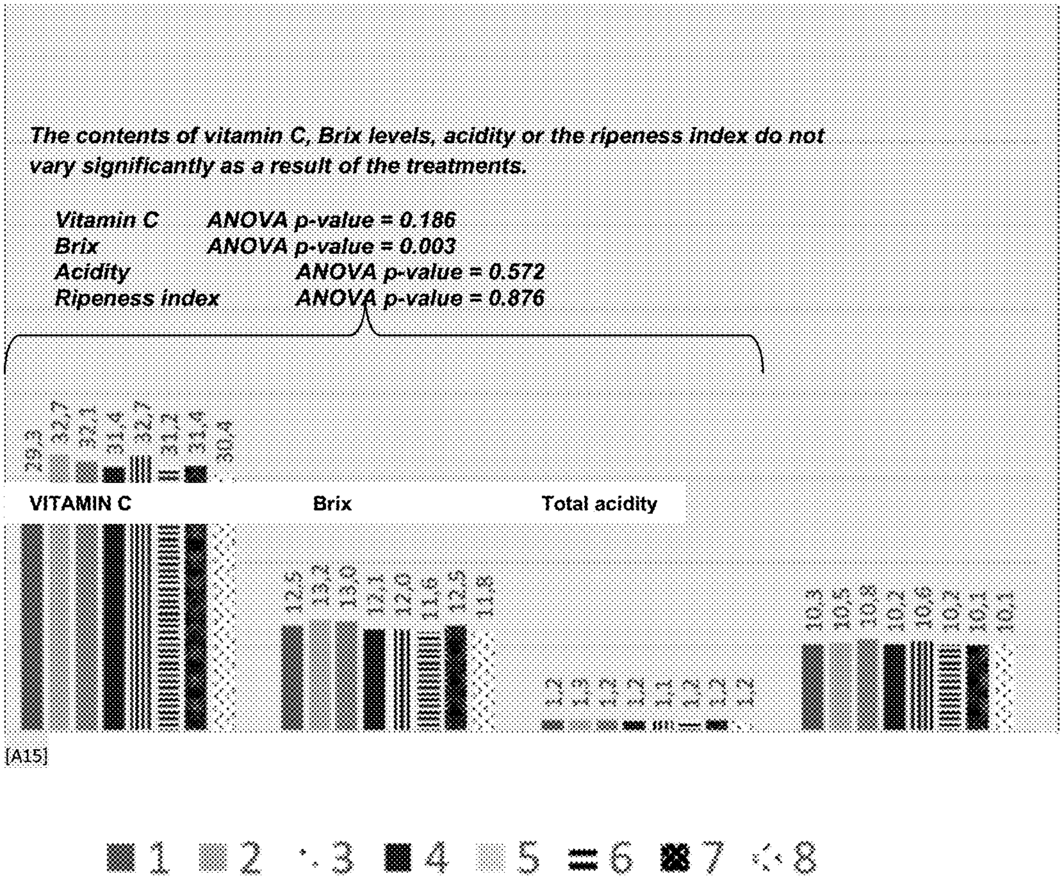
Figure 26C:
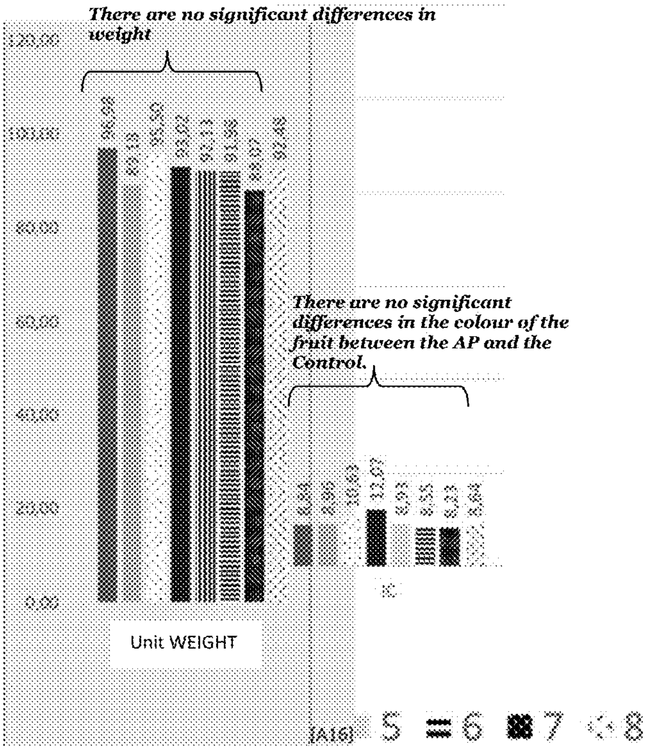

Results: As shown in FIGS. 26A-26C, the active product (AP) does not have an effect on quality parameters: % peel, % juice, % pulp, vitamin C, Brix, total acidity, ripeness index, unit weight and colour of the fruit.

REFERENCES CITED

1. Gambetta G, Gravina A, Fasiolo C, Fornero C, Galiger S, Inzaurralde C, et al. Self-incompatibility, parthenocarpy and reduction of seed presence in "Afourer" mandarin. Scientia Horticulturae. 2013; 164:183-188. doi: 10.1016/j.scienta.2013.09.002
2. Garmendia A, Beltrán R, Zornoza C, Breijo F, Reig J, Bayonal, et al. Insect repellent and chemical agronomic treatments to reduce seed number in 'Afourer' mandarin. Effect on yield and fruit diameter. Scientia Horticulturae. 2019; 246:437-447. doi: 10.1016/j.scienta.2018.11.025
3. Roldán J J, Navarro J L. Aplicaciones de la biotecnología en los cítricos y otros cultivos. Fruticultura profesional. 2001; 19-32.
4. Vardi A, Levin I, Carmi N. Induction of seedlessness in *citrus*: from classical techniques to emerging biotechnological approaches. Journal of the American Society for Horticultural Science. 2008; 133:117-126
5. Gravina A, Gambetta G, Rey F, Guimaraes N. Mejora de la productividad en mandarina 'Afourer' en aislamiento de polinización cruzada. Agrociencia Uruguay. 2016; 20:22-28
6. Otero A, Rivas F. Field spatial pattern of seedy fruit and techniques to improve yield on 'Afourer' mandarin. Scientia Horticulturae. 2017; 225:264-270. doi: 10.1016/j.scienta.2017.06.067
7. Mesejo C, Martínez-Fuentes A, Reig C, Agustí M. Gibberellic acid impairs fertilization in Clementine mandarin under cross-pollination conditions. Plant Science. 2008; 175: 267-271. doi: 10.1016/j.plantsci.2008.04.008
8. Mesejo C, Martínez-Fuentes A, Reig C, Rivas F, Agusti M. The inhibitory effect of CuSO4 on *Citrus* pollen germination and pollen tube growth and its application for the production of seedless fruit. Plant Science. 2006; 170:37-43
9. Spiegel R. Economic and agricultural impact of mutation breeding in fruit trees. 1990;
10. Li D, Shi W, Deng X. *Agrobacterium*-mediated transformation of embryogenic calluses of Ponkanmandarin and the regeneration of plants containing the chimeric ribonuclease gene. Plant Cell Reports. 2002; 21:153-156
11. Olivares-Fuster O, Juárez J, Aleza P, Pina J A, Ballester-Olmos J F, Cervera M, et al. Applications of biotechnology to *citrus* improvement in Spain. XXVI International Horticultural Congress: *Citrus* and Other Subtropical and Tropical Fruit Crops: Issues, Advances and 632. 2002. pp. 221-234.
12. Luro F, Maddy F, Jacquemond C, Froelicher Y, Morillon R, Rist D, et al. Identification and evaluation of diplogynyin clementine (*Citrus clementina*) for use in breeding. ActaHort. 2004; 663:84.
13. Zhang S, Shi Q, Albrecht U, Shatters Jr R G, Stange R, McCollum G, et al. Comparative transcriptome analysis during early fruit development between three seedy *citrus* genotypes and their seedless mutants. Horticulture research. 2017; 4:17041.
14. AVA-ASAJA. Las variedades del IVIA Safory Garbí presentan graves problemas en la piel que frenan su comercialización. ASAJA Publicaciones. Valencia; 7 May 2015.
15. Lladró V. Las mandarinas estrella del IVIA se manchan. Las Provincias. Valencia; 5 Feb. 2013.
16. Sachs R M, Bretz. C. F, Lang A. Shoot histogenesis: the early effects of gibberellin upon stem elongation in two rosette plants. American Journal of Botany. 1959; 46: 376-384
17. Kende H, Zeevaart J A. The five "Classical" plant hormones. The plant cell. 1997; 9: 1197-1210
18. de Siqueira D L, Cecon P R, Chamhum Salomao L C. Growth of "Volkameriano" lemon tree treated with paclobutrazol and gibberellic acid. Revista Brasileira De Fruticultura. 2008; 30:764-768. doi: 10.1590/S0100-29452008000300034
19. Dilip W S, Singh D, Moharana D, Rout S, Patra S S. Effect of Gibberellic Acid (GA) Different Concentrations at Different Time Intervals on Seed Germination and Seedling Growth of Rangpur Lime. J Agroeco Nat Resource Management. 2017; 4:157-165
20. Zacarias L, Talon M, Ben Cheikh W, Lafuente M T, Primo Millo E. Abscisic acid increases in non-growing and paclobutrazol-treated fruits of seedless mandarins. *Physiologia Plantarum.* 1995; 95:613-619
21. Talon M, Zacarias L, Primomillo E. Gibberellins and Parthenocarpic Ability in Developing Ovaries of Seedless Mandarins. Plant Physiology. 1992; 99:1575-1581. doi: 10.1104/pp. 99.4.1575
22. Powell A, Krezdorn A. Influence of Fruit-Setting Treatment on Translocation of Metabolites-C-14 in *Citrus* During Flowering and Fruiting. Journal of the American Society for Horticultural Science. 1977; 102:709-714
23. Mauk C S, Bausher M G, Yelenosky G. Influence of growth regulator treatments on dry matter production, fruit abscission, and 14C-assimilate partitioning in *citrus*. Journal of Plant Growth Regulation. 1986; 5:111-120. doi: 10.1007/BF02025962.

The invention claimed is:

1. A method for causing alteration of stigma papillary cells of horticultural plants and/or fruit trees and thereby preventing the formation of seeds in a fruit of said horticultural plants and/or fruit trees, said method comprising selecting a horticultural plant or a fruit tree for preventing the formation of seeds, and applying an effective amount of a composition comprising sulphur (S) in the form of an octatomic molecule (S8) on a stigma of the selected horticultural plant and/or fruit tree during a flowering stage, wherein the horticultural plant is not a plant in the Vitaceae family.

2. The method of claim 1, wherein the composition further comprises a surfactant and a plant hormone, and wherein application is performed on the flower of the horticultural plant and/or fruit tree during the flowering stage in a state of pre-pollination.

3. The method of claim 1, wherein application is performed by spraying or soaking.

4. The method of claim 1, wherein the composition is applied during a crop flowering period.

5. The method of claim 2, wherein the pant hormone is gibberellic acid and/or an auxin.

6. The method of claim 2, wherein the plant hormone is gibberellic acid and the surfactant is polysorbate 20.

7. The method of claim 6 wherein the composition comprises:

0.1 g/L-100 g/L polysorbate 20;

0.1 g/L-100 g/L sulphur (S) as an octatomic molecule ($S_8$); and 1 mg/L-300 mg/L gibberellic acid.

* * * * *